US011985100B2

(12) United States Patent
Rathi et al.

(10) Patent No.: US 11,985,100 B2
(45) Date of Patent: May 14, 2024

(54) MANAGEMENT OF DELEGATES FOR PARTICIPANTS THAT ARE MENTIONED IN A COMMUNICATION SESSION

(71) Applicant: MICROSOFT TECHNOLOGY LICENSING, LLC, Redmond, WA (US)

(72) Inventors: Hitesh Rathi, Belevue, WA (US); Vijay Ramdas, Redmond, WA (US)

(73) Assignee: Microsoft Licensing Technology, LLC, Redmond, WA (US)

(*) Notice: Subject to any disclaimer, the term of this patent is extended or adjusted under 35 U.S.C. 154(b) by 0 days.

(21) Appl. No.: 17/845,902

(22) Filed: Jun. 21, 2022

(65) Prior Publication Data

US 2023/0412547 A1 Dec. 21, 2023

(51) Int. Cl.
*H04L 51/04* (2022.01)
*H04L 51/07* (2022.01)
(Continued)

(52) U.S. Cl.
CPC .............. *H04L 51/21* (2022.05); *H04L 51/04* (2013.01); *H04L 51/07* (2022.05)

(58) Field of Classification Search
CPC ......... H04L 51/04; H04L 51/07; H04L 51/21; H04L 51/214; H04L 63/101; H04L 51/043; H04L 51/216
(Continued)

(56) References Cited

U.S. PATENT DOCUMENTS 8,205,163 B2   6/2012   Shaffer et al.
2010/0161743 A1*  6/2010  Krishnamurthi ...... H04L 51/234
                                                      709/206
(Continued)

OTHER PUBLICATIONS

Tom H., "Microsoft Teams—Using @'s and the Searching Function", Retrieved from: https://web.archive.org/web/20201027155919/https://kb.wisc.edu/cals/page.php?id=92176, Jun. 4, 2019, 4 Pages.
(Continued)

*Primary Examiner* — Meng Vang
(74) *Attorney, Agent, or Firm* — Scott Y. Shigeta; Newport IP, LLC

(57) ABSTRACT

The techniques disclosed herein provide systems that provides delegation for unavailable participants that are mentioned in a communication session, such as a channel, chat session, email thread, meeting chat, etc. When a system detects that a person, also referred to herein as a "primary participant," is mentioned in a message, e.g., an "@mention" or "@name" is detected, and the system detects that the mentioned person has set an out-of-office reply or otherwise indicated an unavailable status, the system automatically identifies a delegate and packages the immediate message including "@name" and the message thread including the immediate message, and sends the packaged communications to the delegate. Permissions are also modified so that a computer associated with the delegate can display messages of the thread and send messages to the thread on behalf of mentioned person. When the delegate responds, the system directs the response to reply to the main thread.

20 Claims, 32 Drawing Sheets

(51) Int. Cl.
*H04L 51/21* (2022.01)
*H04L 51/214* (2022.01)

(58) Field of Classification Search
USPC .......................................................... 709/206
See application file for complete search history.

(56) References Cited

U.S. PATENT DOCUMENTS

| | | | |
|---|---|---|---|
| 2018/0048604 A1 | 2/2018 | Mikhailov et al. | |
| 2018/0324135 A1 | 11/2018 | Bastide et al. | |
| 2020/0162461 A1* | 5/2020 | Blankinship | H04L 51/42 |
| 2021/0192458 A1 | 6/2021 | Nagaraj et al. | |
| 2021/0243147 A1 | 8/2021 | Patrick | |
| 2021/0344797 A1* | 11/2021 | Saraff | H04M 3/543 |

OTHER PUBLICATIONS

Bartley, Doyle, "Displaying Out-of-Office Message When Being @-Mentioned", Retrieved from: https://ideas.salesforce.com/s/idea/a0B8W00000Gdd9CUAR/displaying-outofoffice-message-when-being-mentioned, Jul. 8, 2014, 3 Pages.

Rachel May, Quin, "How to Find and Track Mentions on Twitter", Retrieved from: https://resources.audiense.com/blog/faq-find-mentions-twitter, Dec. 4, 2014, 33 Pages.

"International Search Report and Written Opinion issued in PCT Application No. PCT/US23/021093", dated Aug. 7, 2023, 16 Pages.

* cited by examiner

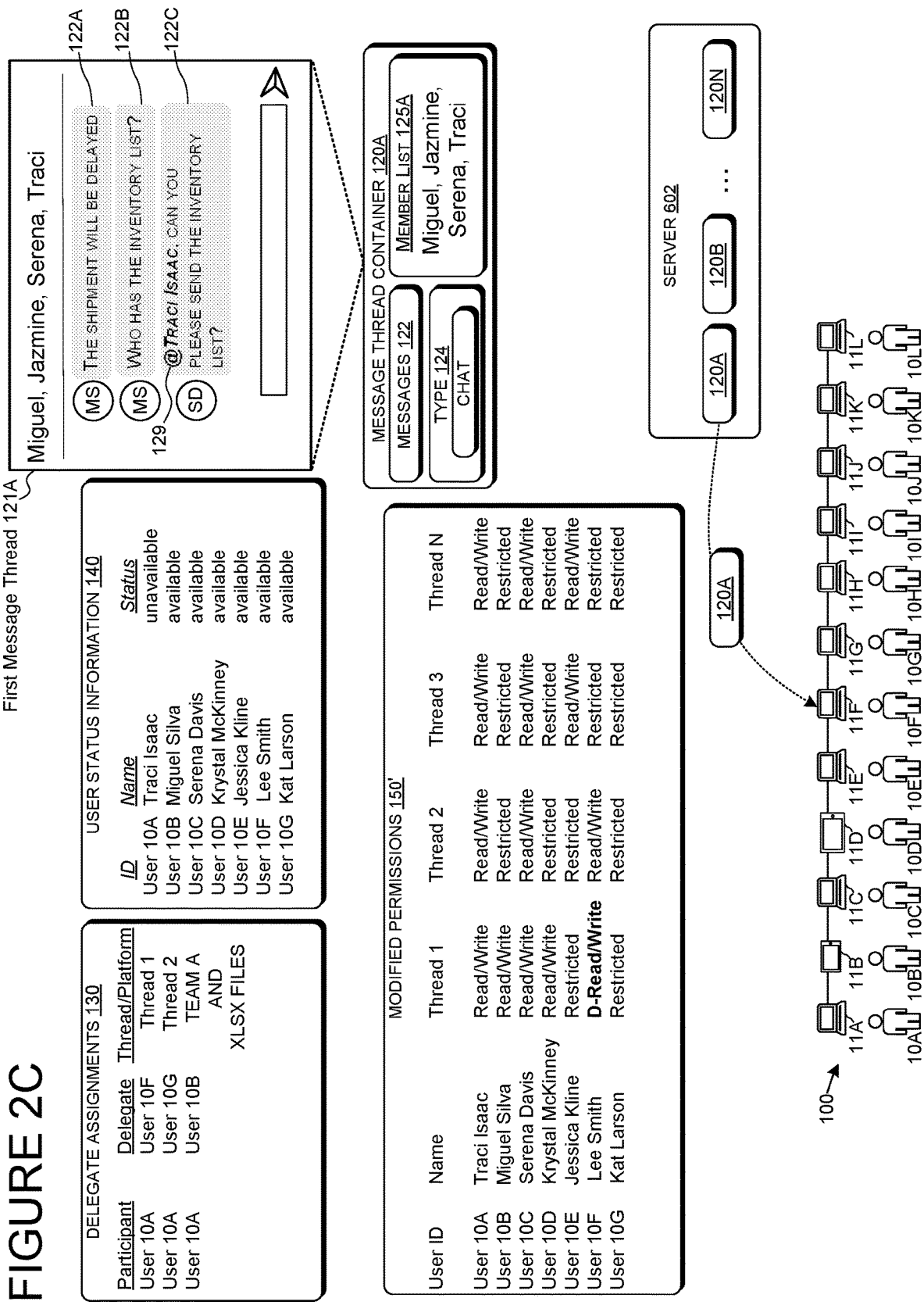

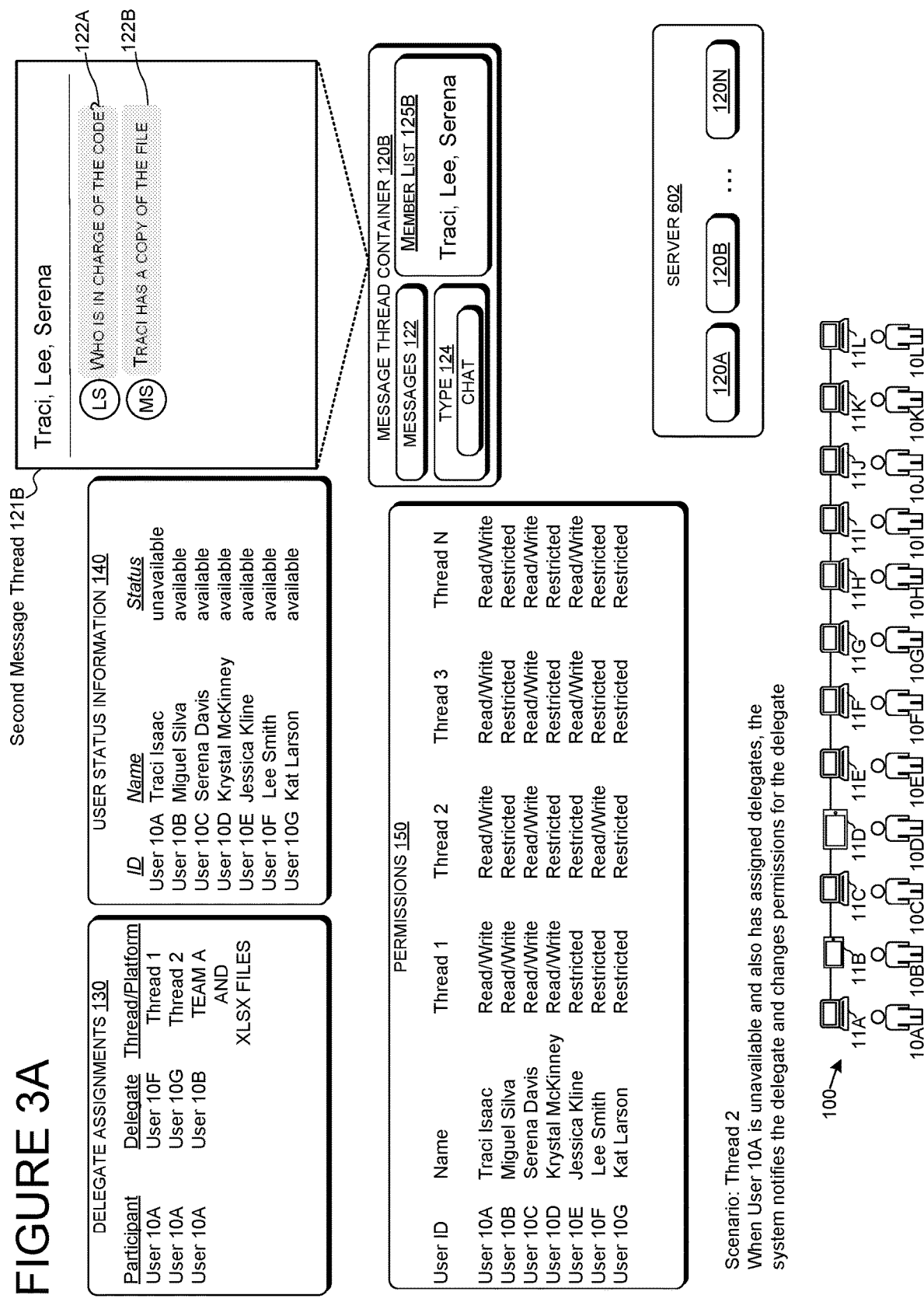

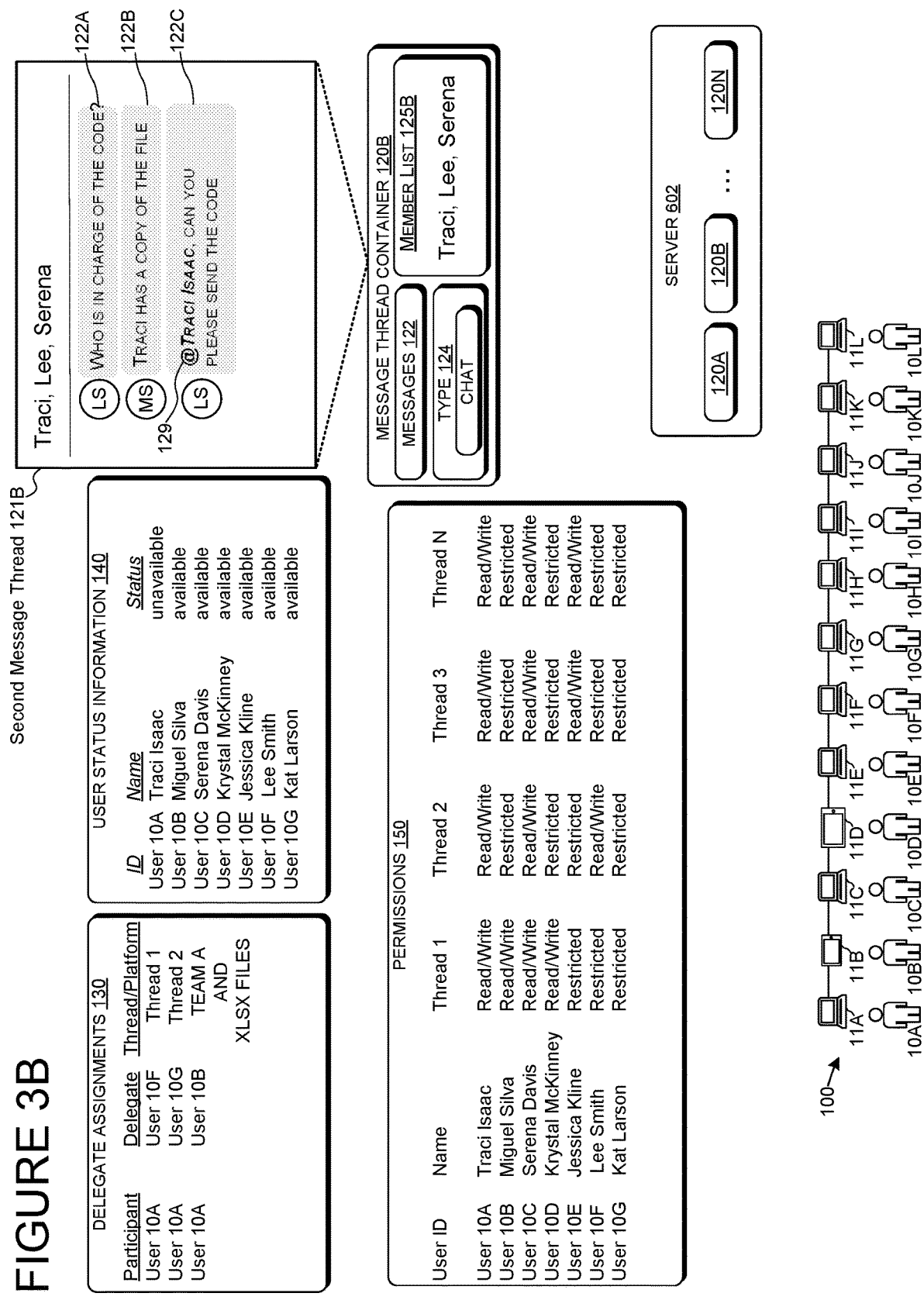

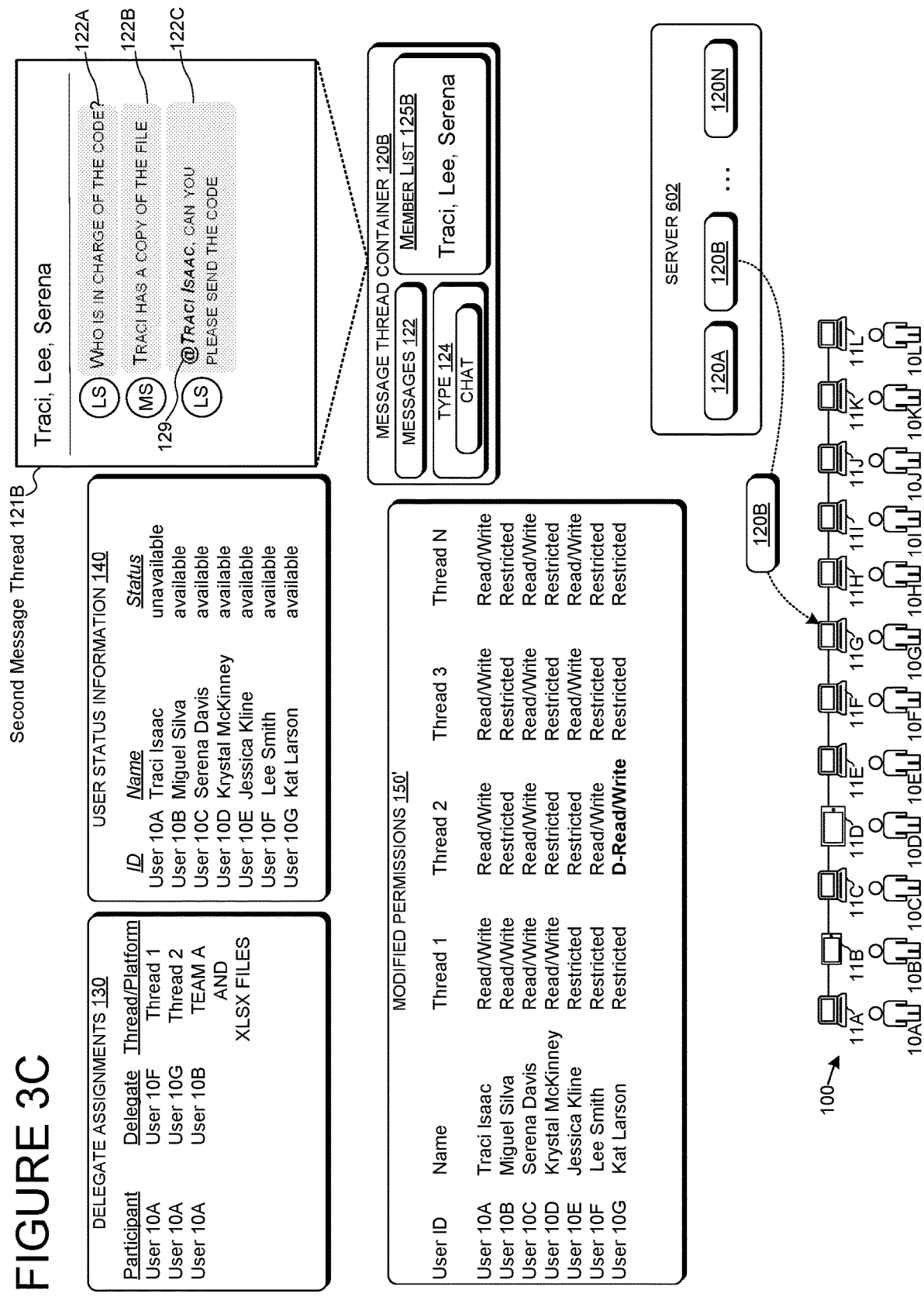

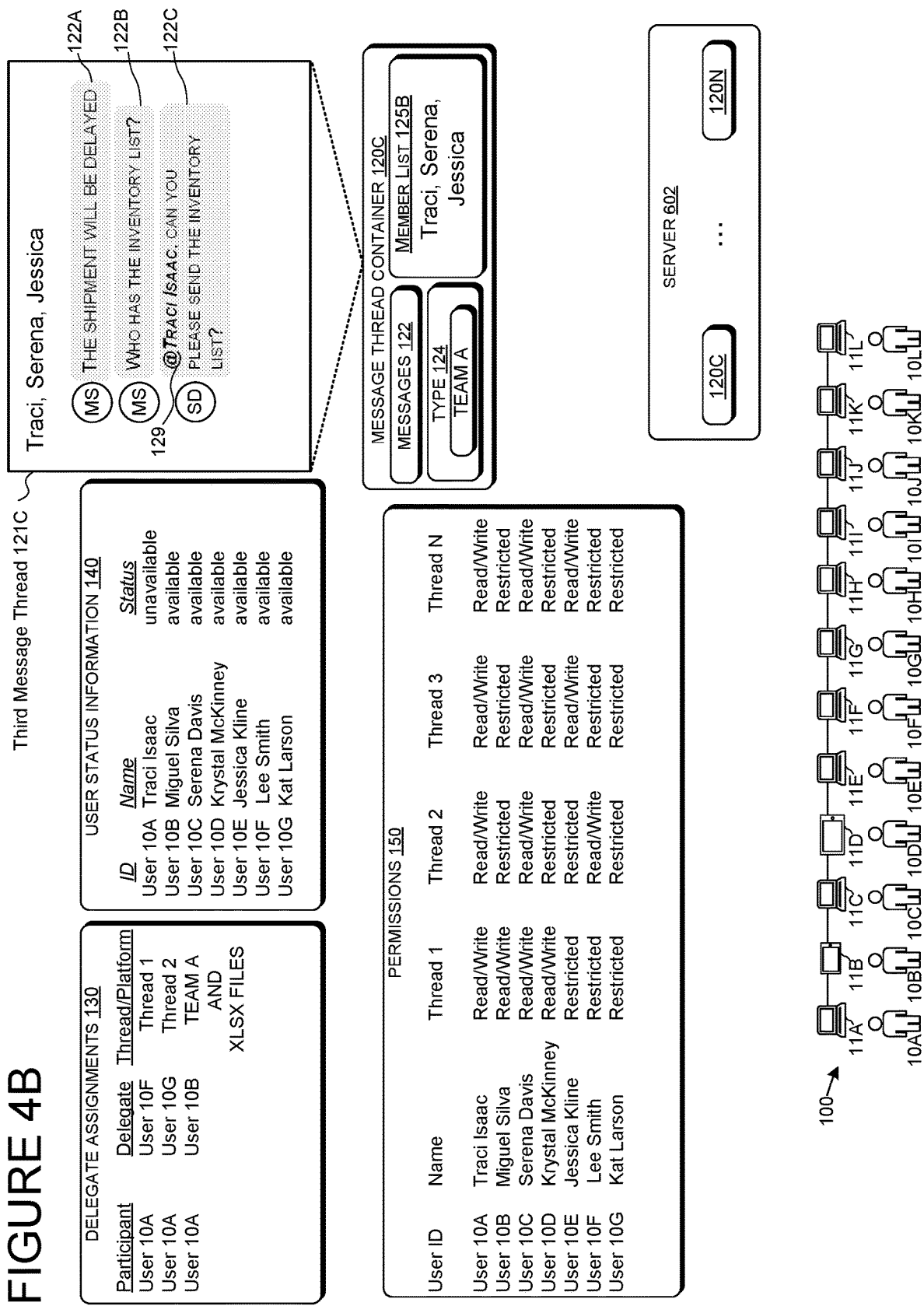

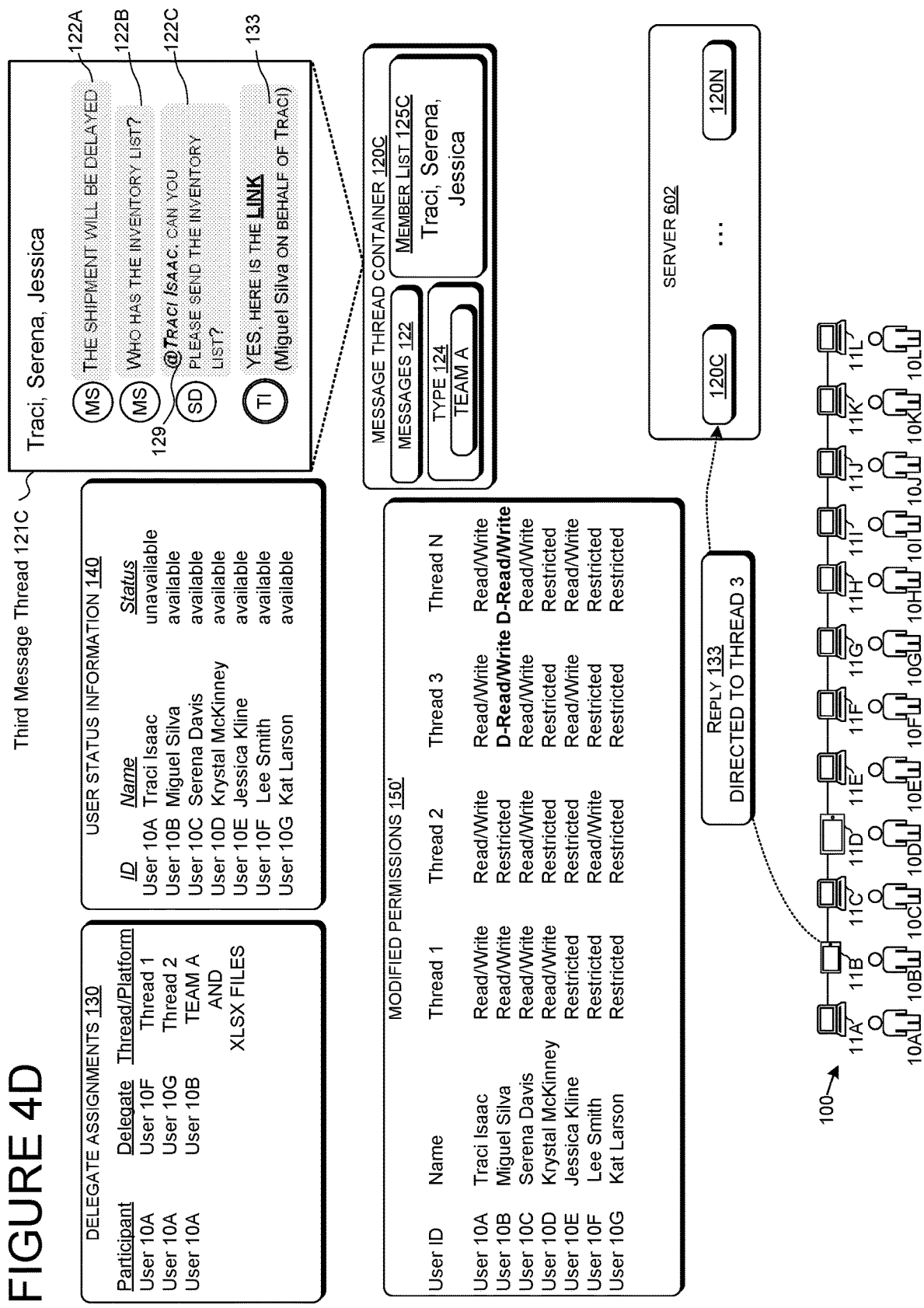

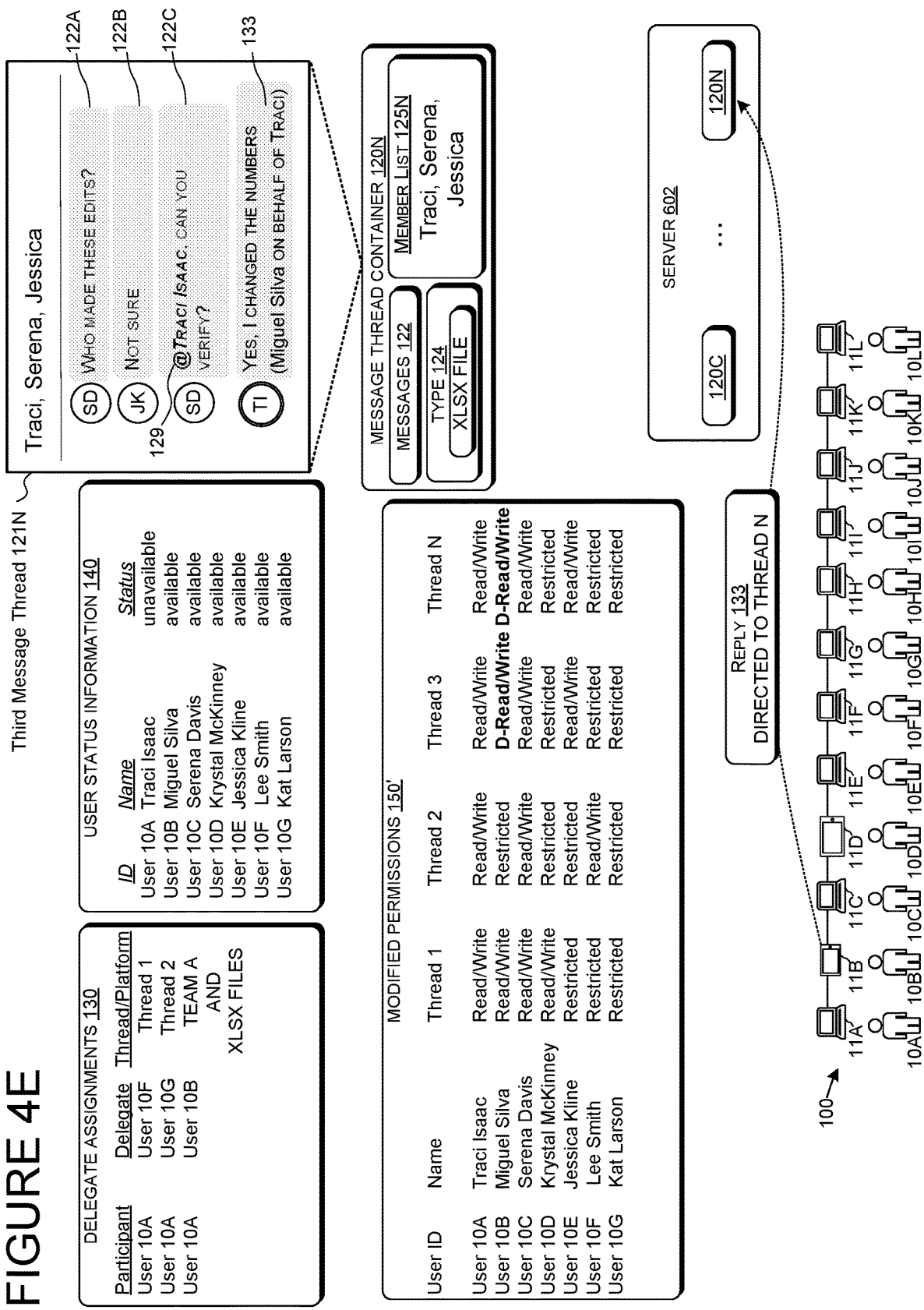

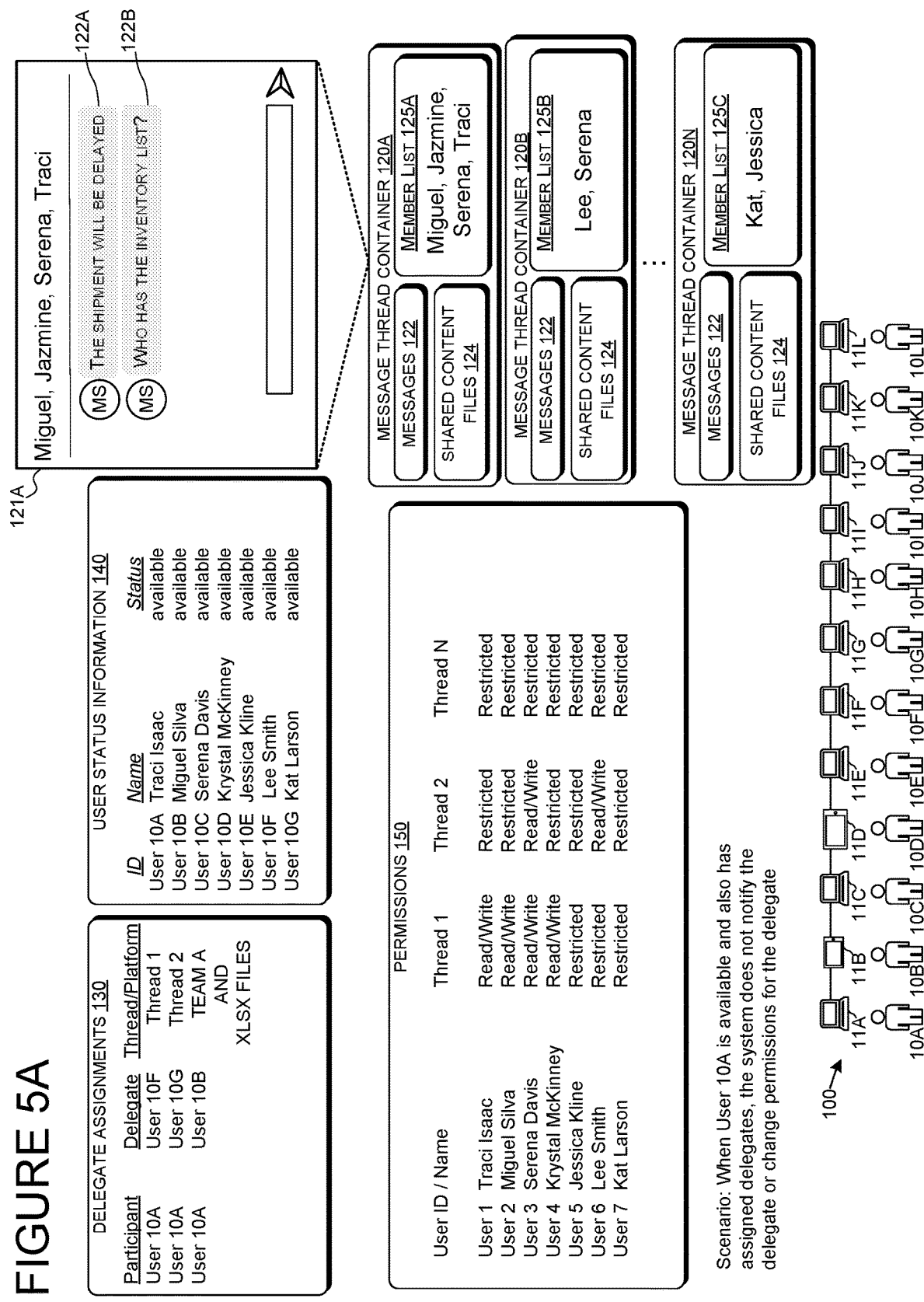

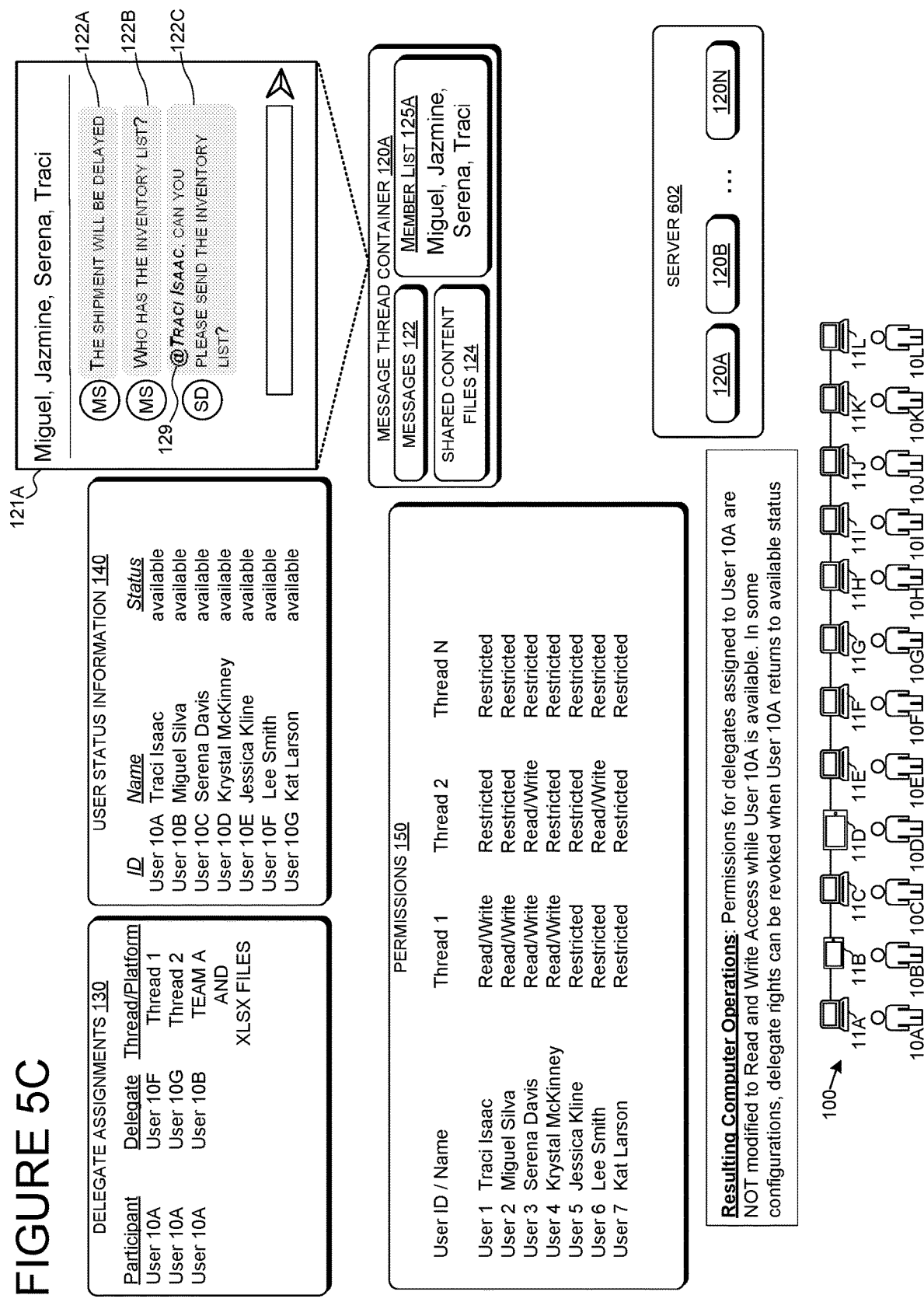

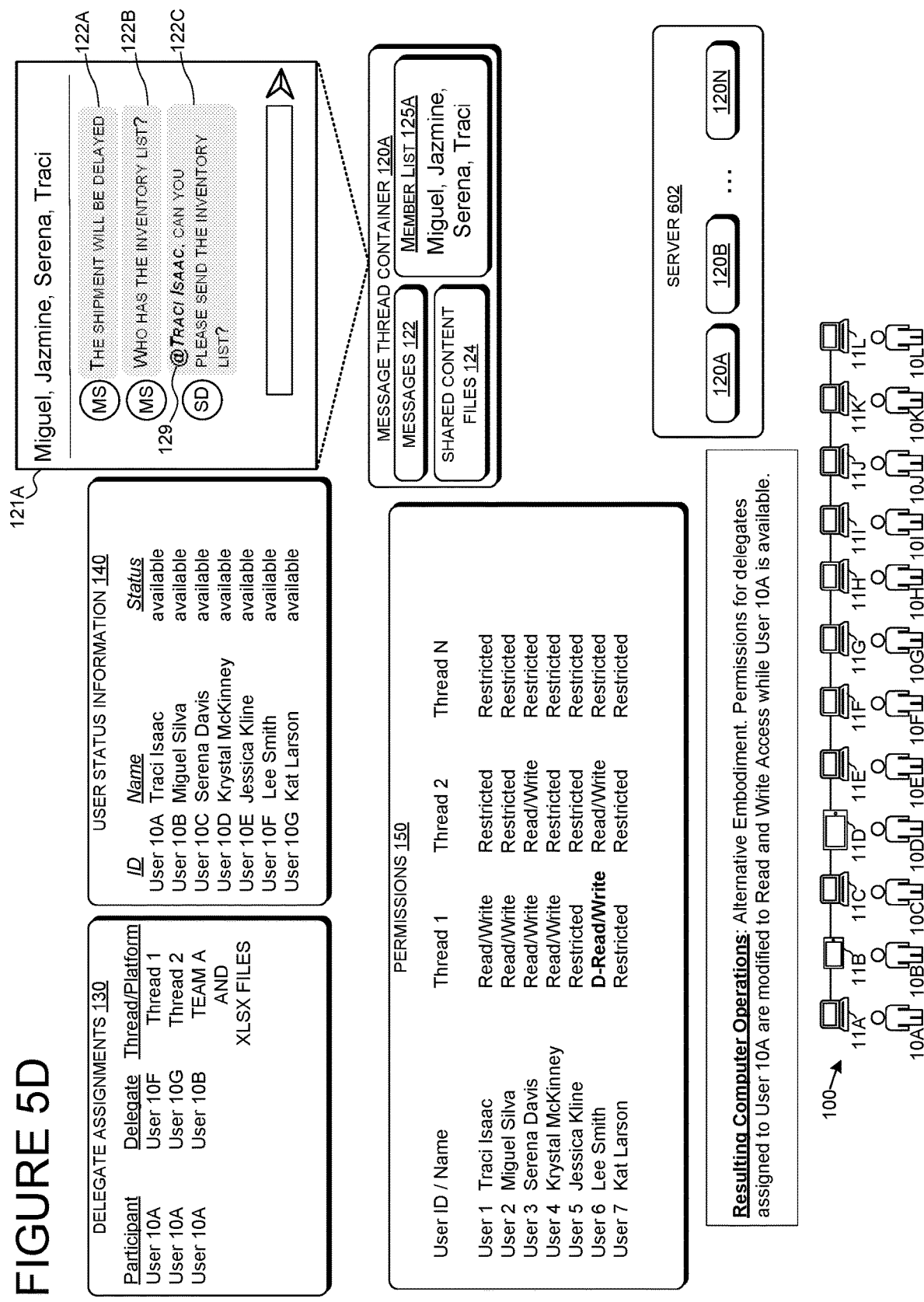

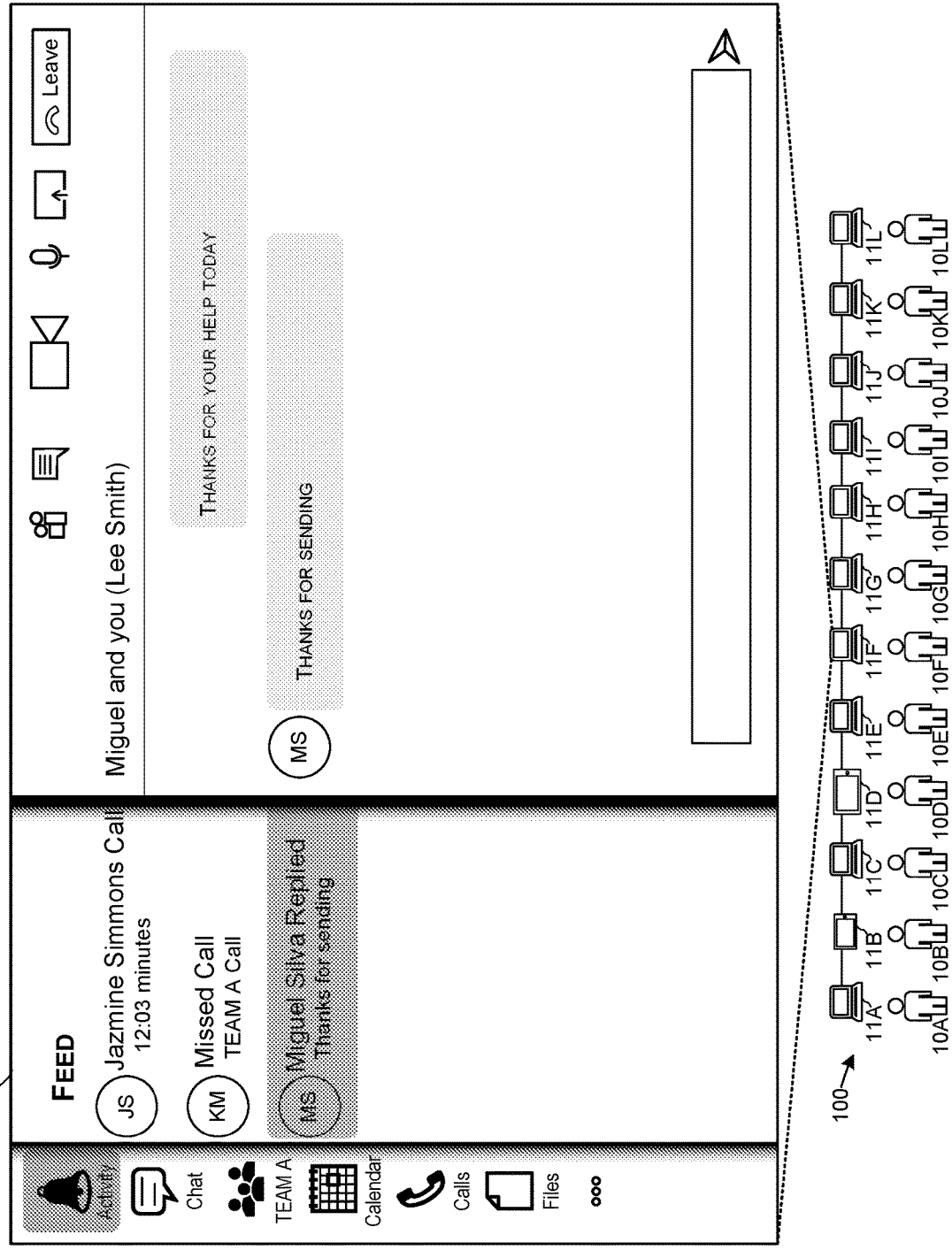

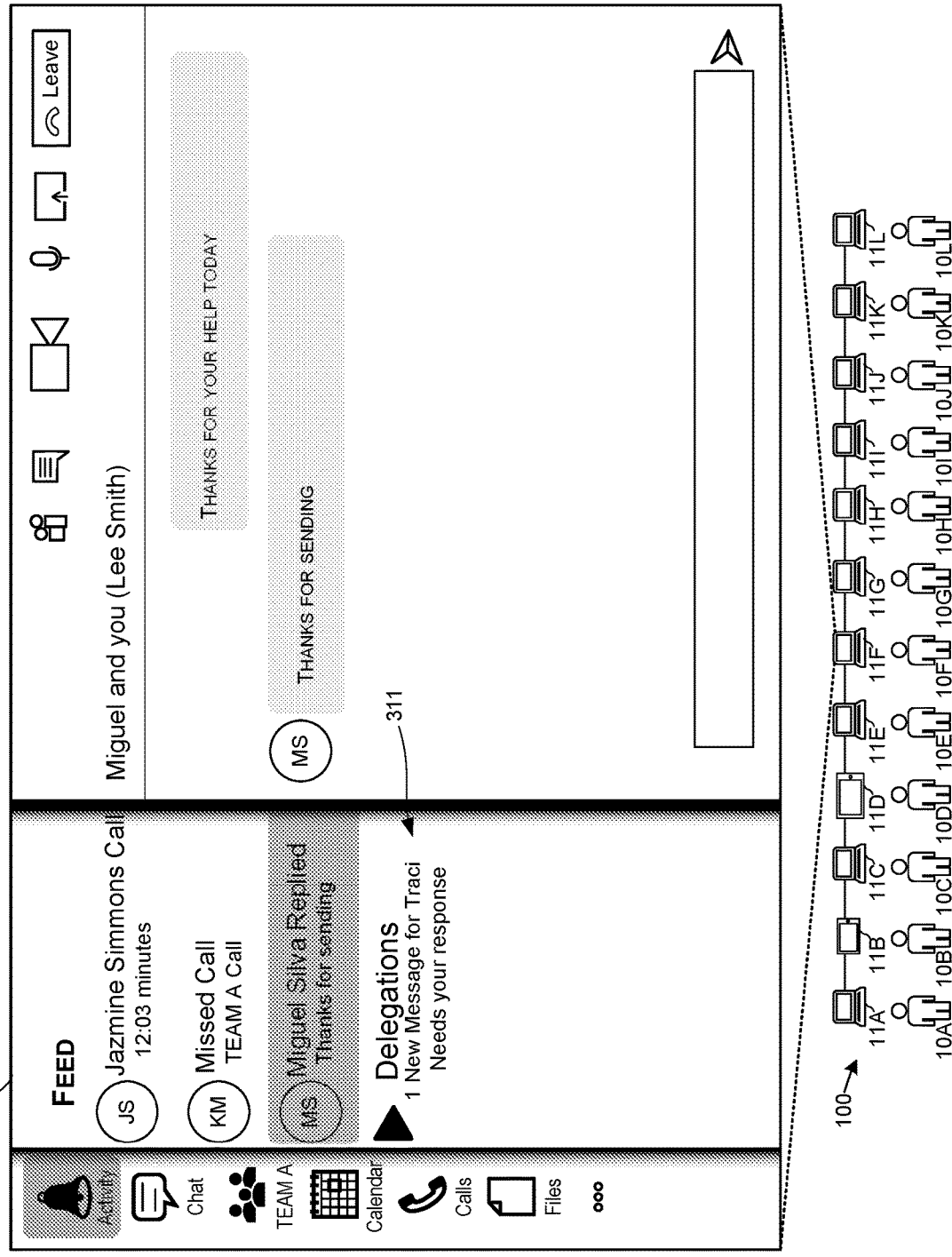

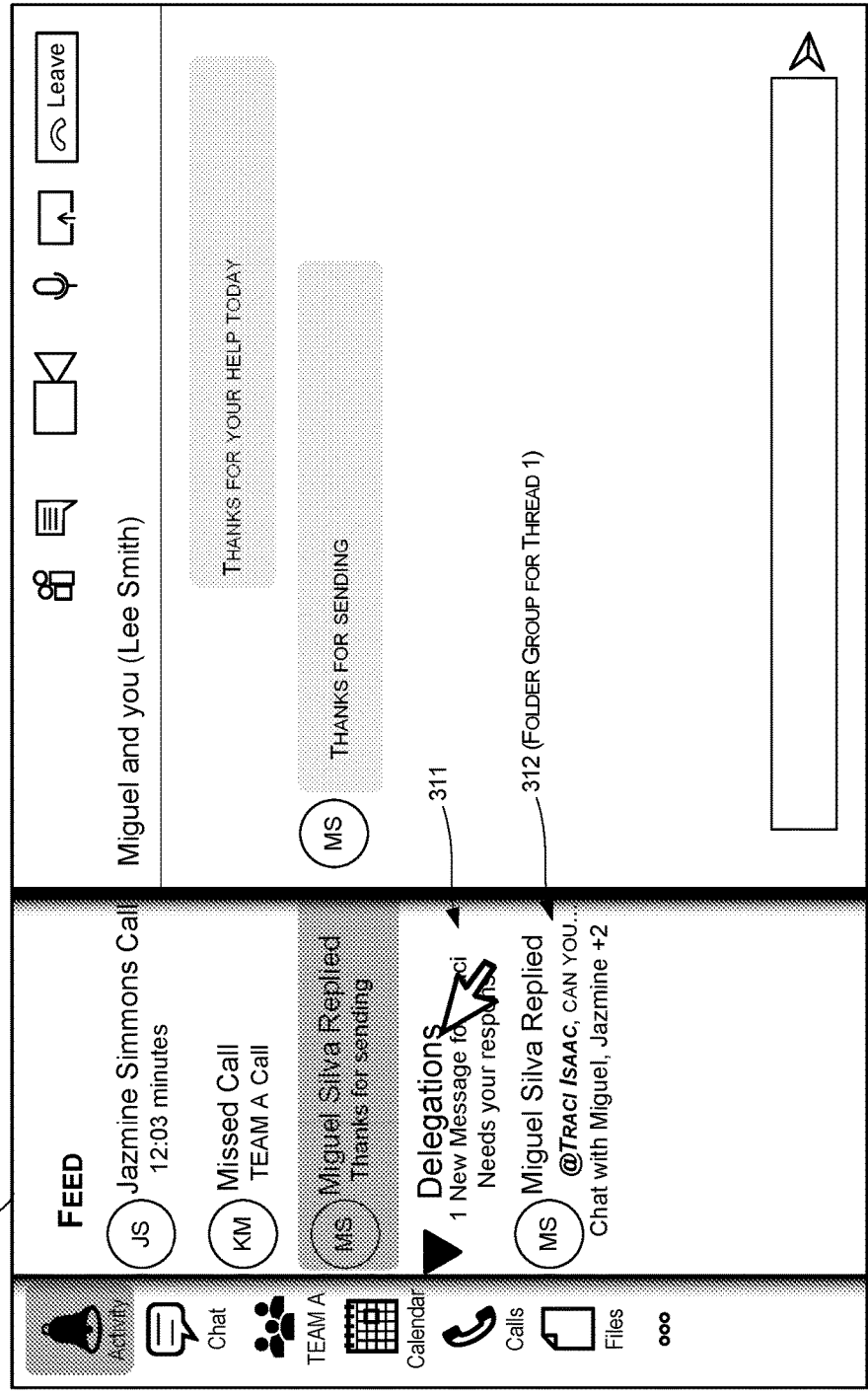

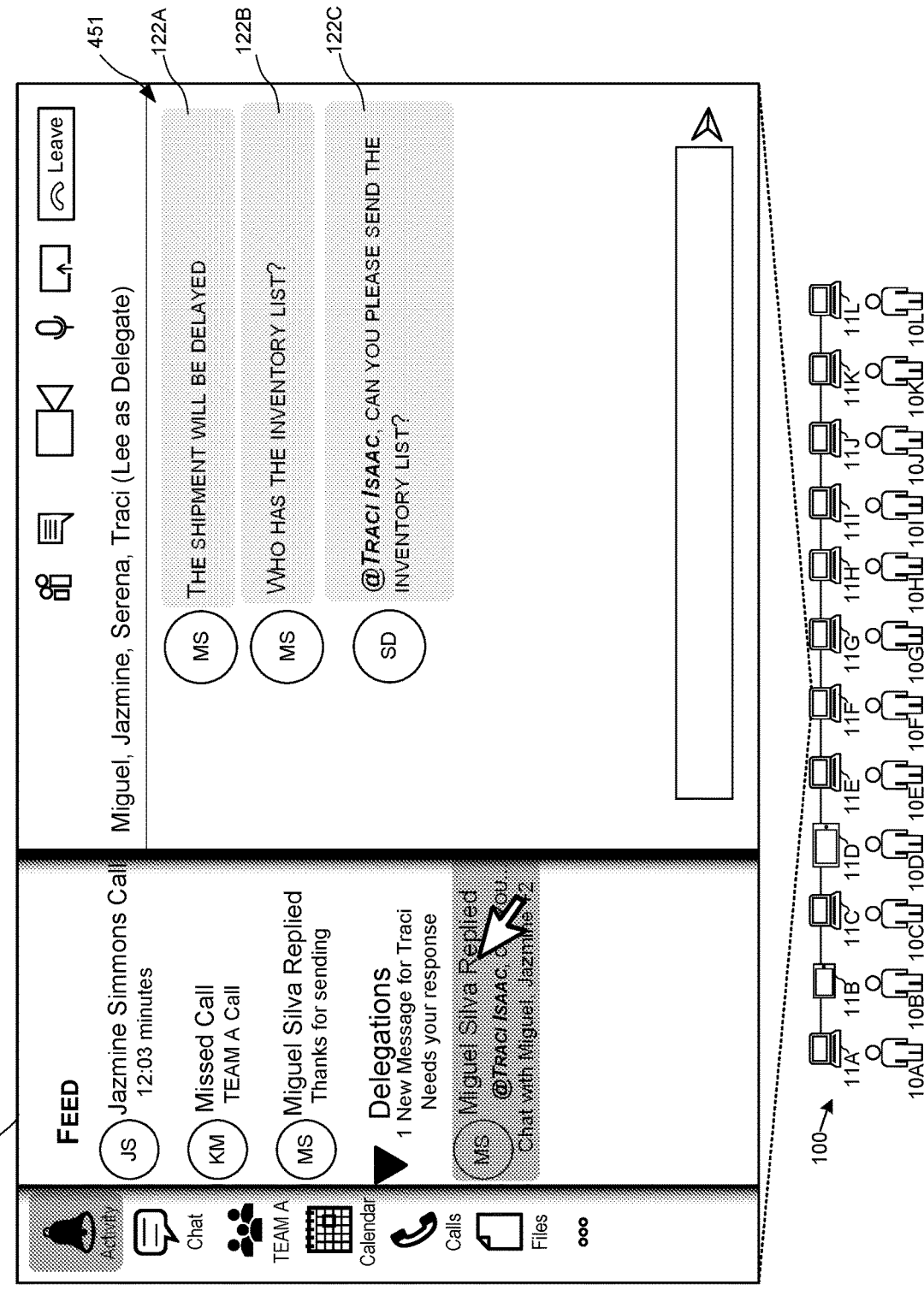

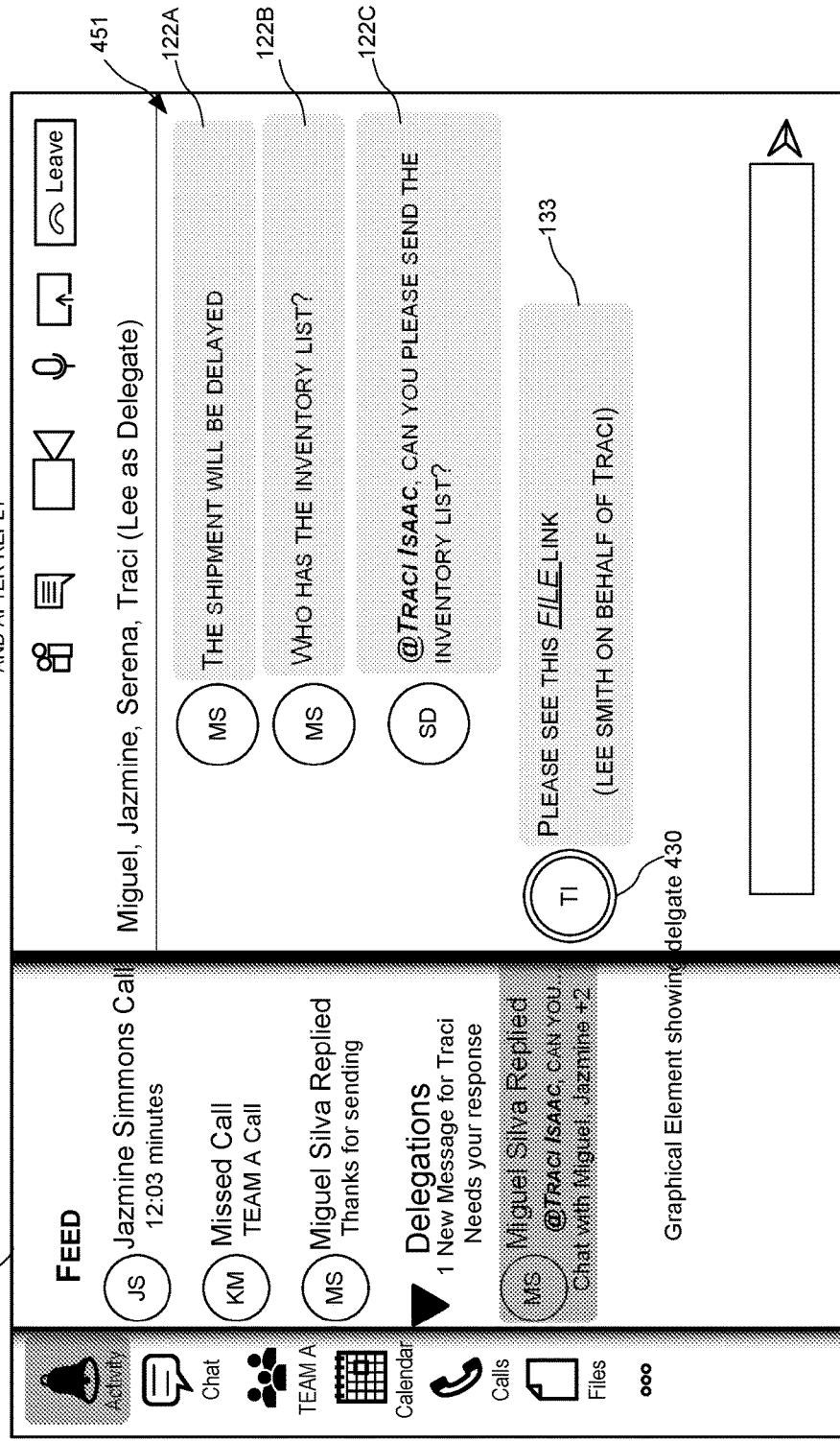

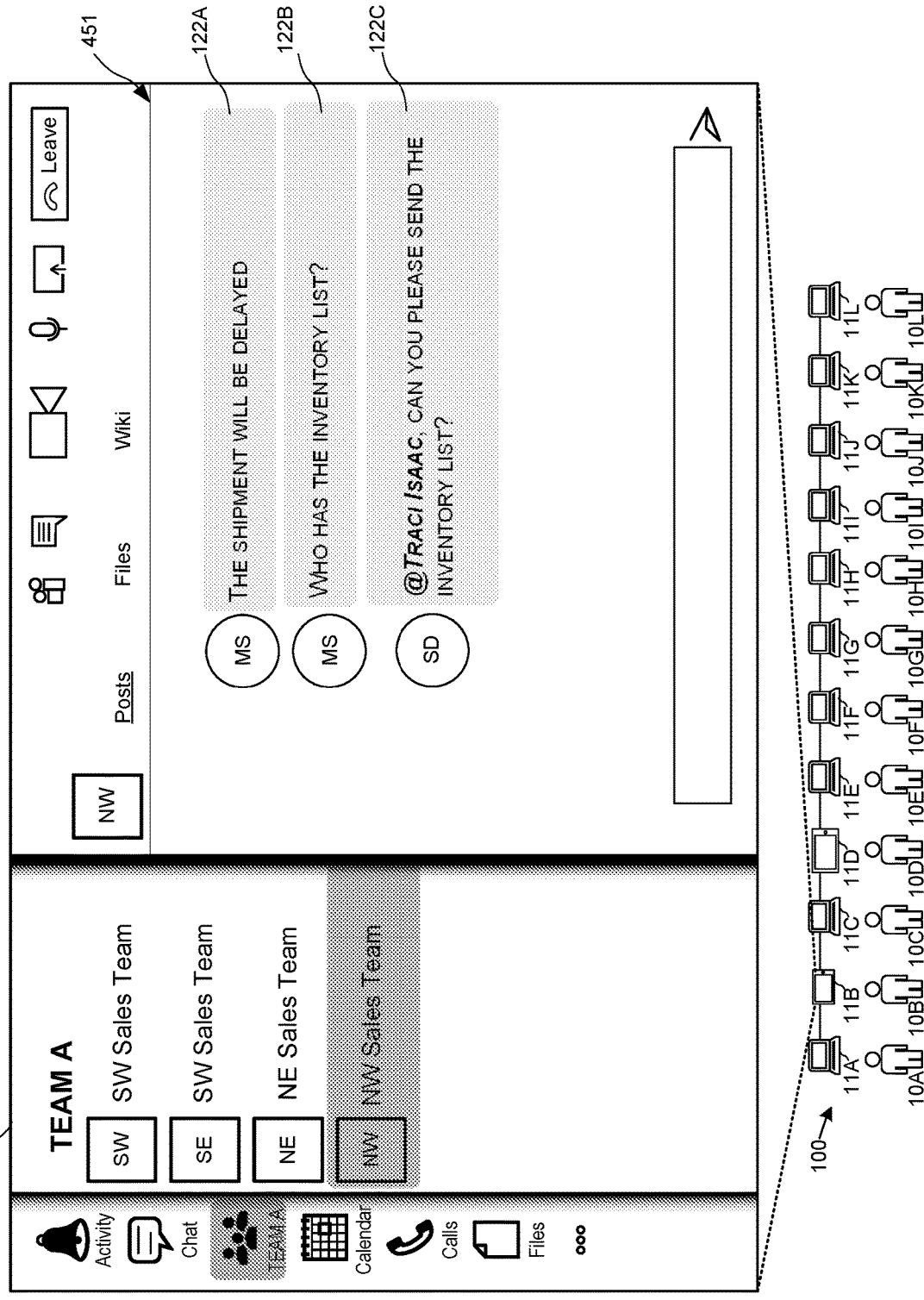

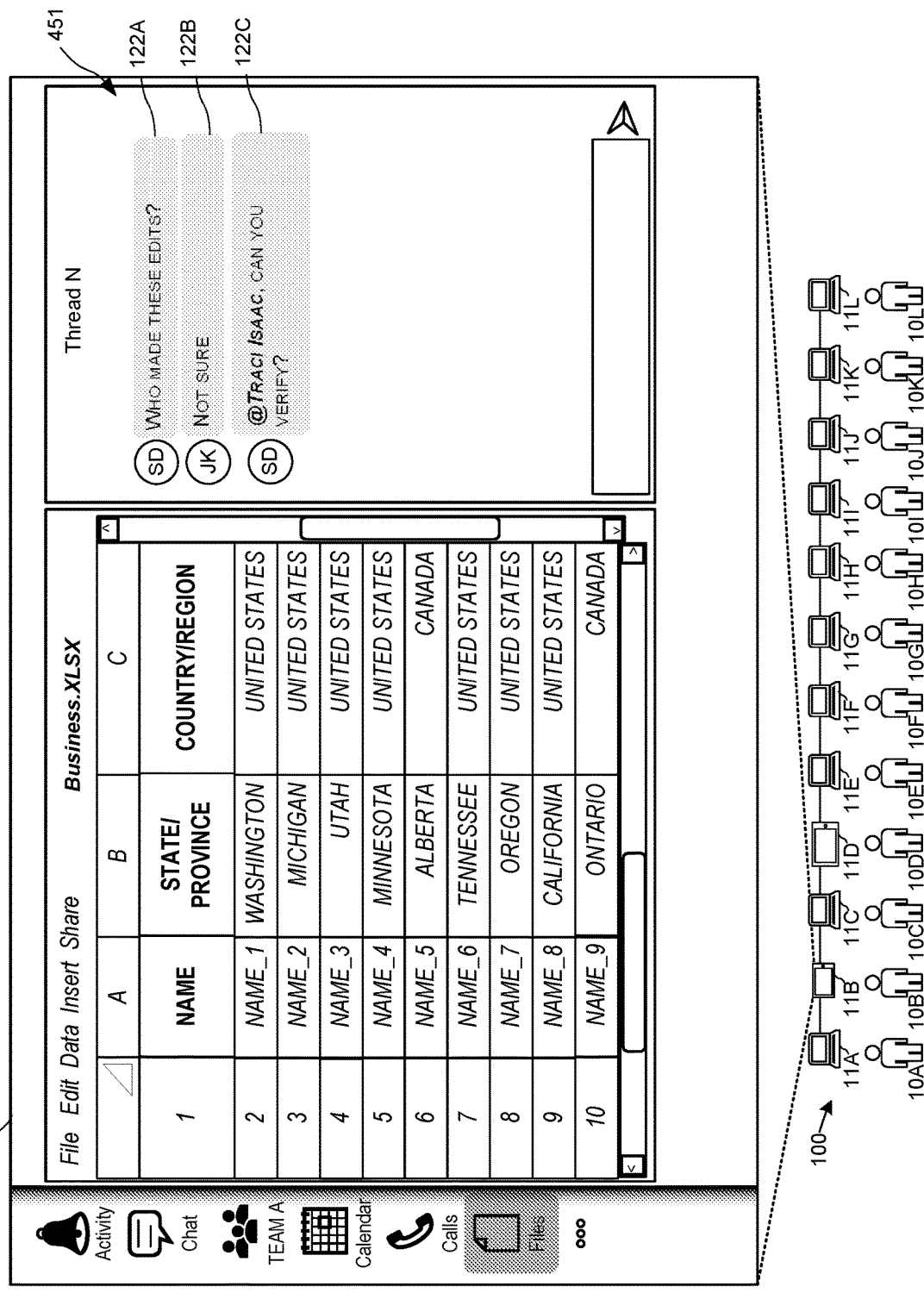

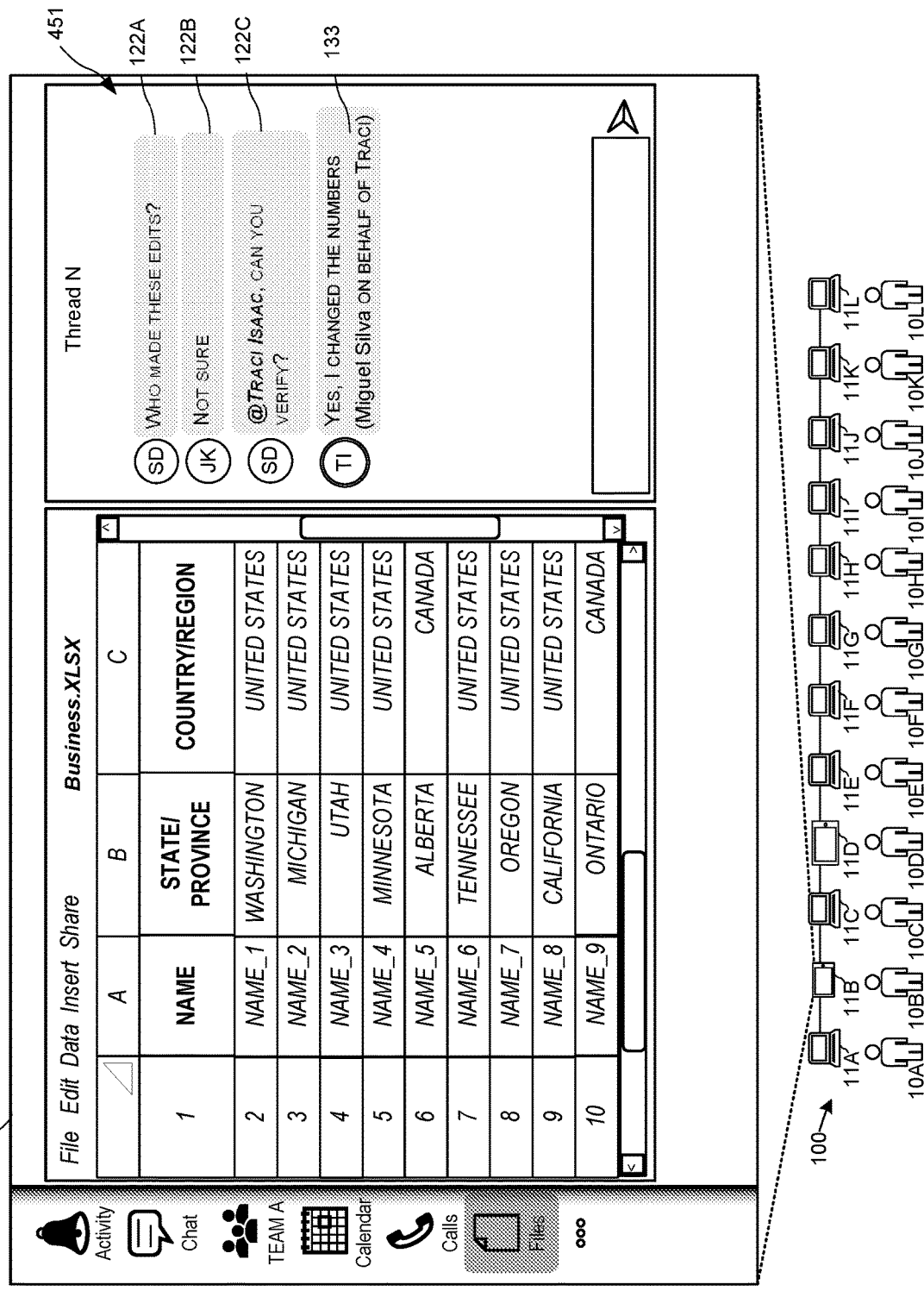

MANAGEMENT OF DELEGATES FOR PARTICIPANTS THAT ARE MENTIONED IN A COMMUNICATION SESSION

BACKGROUND

There are a number of different types of collaborative systems that allow users to communicate. For example, some systems allow people to collaborate by sharing content using video streams, shared files, chat messages, emails, etc. Some systems also allow users to simultaneously edit documents while also enabling them to communicate using video streams, audio streams, and messages. In another example, some systems allow users to exchange text messages within individual documents and make direct references to specific content within the document. In yet another example, some systems allow users to exchange text messages within a user interface that displays video content, while also allowing users to make direct references to specific video content using time markers.

Although existing collaborative systems provide features that enable users to exchange messages, some systems still have a number of drawbacks. In one example, when a thread includes messages that create specific tasks, the workflow of that collaborative effort may be delayed or completely stopped when a task is given to an individual who is unavailable. For example, when a person is @mentioned in a message, the author of the message may ask that person a question or ask for additional shared content. When that person is unavailable, e.g., they are on vacation or if they are in a long meeting, this could stop the progress of the thread until that person returns.

Such issues could be exacerbated by the fact that essential information may only be held by one person that is on that thread. Other people who may have access to the requested information may not be on the thread or it may take the help of other people and other messaging to find people who have the requested information. These issues can cause an array of inefficiencies with respect to the way people interact with computers. If essential information is missing just because someone is unavailable, a number of users may have to send a number of messages or make a number of calls using different mediums of communication to try to locate the information. Even if that information is located, permissions and other security settings may not allow the information to be inserted into the original message thread. When users have to deviate from a standard workflow to locate essential information, this could lead to a number of inefficiency respected network resources, processing resources, memory resources, and other resources.

SUMMARY

The techniques disclosed herein provide systems that provides delegation for unavailable participants that are mentioned in a communication session, such as a channel, chat session, email thread, meeting chat, etc. When a system detects that a person, also referred to herein as a "primary participant," is mentioned in a message, e.g., an "@mention" or "@name" is detected, and the system detects that the mentioned person has set an out-of-office reply or otherwise indicated an unavailable status, the system automatically identifies a delegate and packages the immediate message including "@name" and the message thread including the immediate message, and sends the packaged communications to the delegate. Permissions are also modified so that a computer associated with the delegate can display messages of the thread and send messages to the thread on behalf of mentioned person. When the delegate responds, the system automatically directs the response to the main thread. The out-of-office status or unavailable status for the primary participant can be set by the setup of automatic reply messages in an email system, blocking out time in a calendar, or generating any other communication that indicates that they will be unavailable. The system automatically creates a folder or groups all messages relating to the "@mention" in the delegate's user interface (UI). For illustrative purposes, when a participant is mentioned in a message, an identifier for that participant can be embedded in the message and linked to a portion of the message, e.g., a person's name in the message can provide a link to that person's identifier. When a participant is mentioned in a message, it can be referred to herein as an "@mention" or a "reference" to that participant.

In some embodiments, the primary participant can add different delegate users for different levels of granularity involving different delivery interfaces: groups, threads, teams, channels, group chats, communities, pages, etc. For illustrative purposes, a "delivery interface" can also be referred to hearing as a "message forum," and the delivery interface can include classes of user interfaces, applications, documents, document types, etc. When the primary participant is @Mentioned in a specific thread, the delegate will get notified for @mentioned in that thread post. The primary participants can also designate a delegate to participate in threads that are associated with classes of delivery interfaces. Thus, a primary participant could designate one person to be a delegate for all threads in a particular delivery interface, such as a Team. In this example involving a Team, when the primary participant is unavailable and the primary participant has specified a particular delegate, the delegate can view all threads in that Team and respond to particular messages where the primary participant is mentioned, e.g., @mentioned. This can apply to any class of delivery interface, where a delivery interface can include a platform, application, file type, user interface arrangement, etc. In another example, when the primary participant names specific groups of files, e.g., any excel spreadsheets owned by a particular person or a document having a specific word in the file name, the system can automatically grant access rights for a delegate to view and interact with threads in those identified files when the primary participant is out of the office.

The techniques disclosed herein provide a number of technical benefits. For instance, by providing techniques that allow a system to appoint a delegate and provide that delegate with automatic access to a specific set of threads when preset event occurs, a user or administrator doesn't need to have multiple interactions with the system to grant a delegate with permissions to one or more threads. In addition, the disclosed techniques provide additional security for a system. If a system relies on manual entry of data and manual inputs for a person to appoint a delegate, such systems can leave threads exposed for periods of time longer than necessary. This may occur if a person forgets to remove a delegate appointment, which could happen especially in a situation where someone has dozens of delegates for many threads. The techniques disclosed herein grant each delegate with permissions to access threads and to reply to those threads when a thread participant is marked as unavailable, and the system can also remove the delegate appointments and the granted permissions when the thread participant is marked as available. The granted permissions can also extend to other systems, such as a cloud storage service, so that a delegate can also access other files of the participant, which may help in facilitating that person's ability to provide appropriate information to a message thread. This allows higher levels of security for a participant's message threads and lower exposure of potentially sensitive information.

In addition, by providing techniques that allow a system to grant each delegate with permissions to access threads and permissions to reply to those threads when a thread participant is marked as unavailable, a workflow of one or more message threads will not be held up until that person becomes available. If essential information is missing just because someone is unavailable, a number of users may have to send a number of messages or make a number of calls using different mediums of communication, such as phones, email systems, or chat applications, to try to locate the information. Even if that information is located, permissions and other security settings may not allow the information to be inserted into the original message thread. When users have to deviate from a standard workflow to locate essential information, this could lead to a number of inefficiency respected network resources, processing resources, memory resources, and other resources.

In some configurations, the system can grant each delegate with permissions to access threads and permissions to reply to those threads when a thread participant is marked as available as well. This way, a user can appoint a delegate even when they are available to distribute workload to others even when the user is in the office. That user can share their responsibility with someone else. That way, the user can also respond as well. If essential information is missing just because someone cannot respond, a number of users may have to send a number of messages or make a number of calls using different mediums of communication, such as phones, email systems, or chat applications, to try to locate the information. Thus, all examples described herein can change permissions, deliver notifications and delivery thread containers in the manner described herein even when the thread participant is available.

These features can also have other benefits in that, since a user does not need to manually appoint a delegate or grant permissions in real time when a delegate is needed. This reduction in manual entry and the reduction of manual inputs can lead to a reduction in distractions to users. Also, by improving the workflow of a thread and minimizing user disengagement, the disclosed systems help avoid situations where shared content is missed or overlooked. This can reduce occurrences where users need to re-send information. More effective communication of shared content can also help avoid the need for external systems, such as mobile phones for texting and other messaging platforms. This can help reduce the duplicative use of network, processor, memory, or other computing resources especially when prolonged meetings or additional meetings can be avoided.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2C illustrates an example of modified permissions that grant a delegate with permissions to access at least one thread and permissions to reply to the at least one thread when a thread participant is listed as unavailable and when the thread participant is mentioned in a message of one of the threads.

FIG. 3A illustrates a data set where a participant has selected a delegate for another specific thread and activity data indicates that the participant is unavailable.

FIG. 3B illustrates a portion of a message thread where a participant of another thread is mentioned in a message.

FIG. 3C illustrates an example of modified permissions that grant a delegate with permissions to access another specific thread and permissions to reply to the thread when a thread participant is listed as unavailable and when the thread participant is mentioned in a message of one of the threads.

FIG. 4B illustrates a portion of a message thread where a participant of another thread is mentioned in a message, where the message is part of thread in a spreadsheet file.

FIG. 4D illustrates an example where a computer of the specific delegate has access to display a thread of a spreadsheet owned by the participant and where the delegate has provided a response to that thread.

FIG. 4E illustrates an example where a computer of the specific delegate has access to display a thread of a specified Team owned by the participant and where the delegate has provided a response to that thread.

FIG. 5A illustrates a data set where a participant has selected a delegate for a specific thread and activity data indicates that the participant is available.

FIG. 5C illustrates an example of permissions that are restricted from being modified to grant a delegate with permissions to access a specific thread and permissions to reply to the specific thread when a thread participant is listed as available and when the thread participant is mentioned in a message of one of the threads.

FIG. 5D illustrates an example of permissions that are modified to grant a delegate with permissions to access a specific thread and permissions to reply to the specific thread when a thread participant is listed as available and when the thread participant is mentioned in a message of one of the threads.

FIG. 6A illustrates an example a user interface of a communication application showing a private chat session viewed by a user who is designated as a delegate for a message thread participant.

FIG. 6B illustrates an example of a notification to a user who is designated as a delegate for a message thread participant, where the notification indicates that the message thread participant was mentioned in a message.

FIG. 6C illustrates an example of a thread preview that is displayed when a delegate has selected a notification indicating that the message thread participant was mentioned in a message.

FIG. 6D illustrates an example of a UI showing a display of a thread when a delegate has selected the thread preview shown in FIG. 6C.

FIG. 6E illustrates an example of a UI showing a display of a reply generated by a delegate to the thread shown in FIG. 6D.

FIG. 7B illustrates an example of user interface showing a display of a thread for a Team when a delegate has selected the thread preview of the first thread shown in FIG. 7A.

FIG. 8B illustrates an example of user interface showing a display of a thread for a spreadsheet file when a delegate has selected the thread preview of the second thread shown in FIG. 8A.

FIG. 8C illustrates an example of a UI showing a display of a reply generated by a delegate to the thread shown in FIG. 8B.

DETAILED DESCRIPTION

Figure 1:
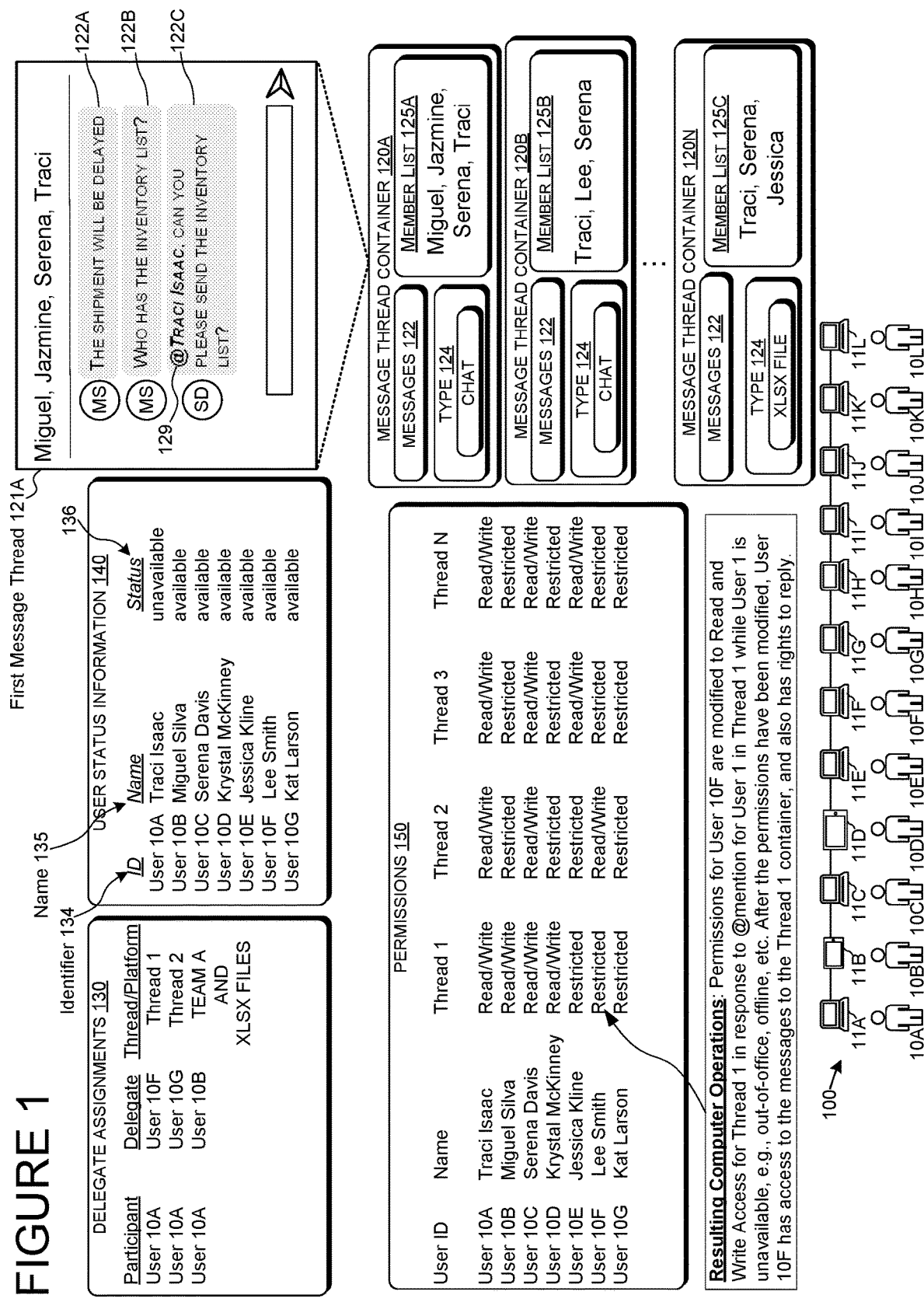
FIG. 1 illustrates an example system that can grant each delegate with permissions to access at least one thread and permissions to reply to those threads when a thread participant is listed as unavailable and when the thread participant is mentioned in a message of one of the threads.

FIG. 1 illustrates a system 100 that can grant each delegate with permissions to access at least one thread and permissions to reply to those threads when a thread participant is listed as unavailable and when the thread participant is mentioned in a message of one of the threads. In this example, a number of people 10 are participating in a communication session, which can involve the communication of messages, shared content, audio, and video streams. The communication session can be managed by a system 100 comprising a number of computers 11 each corresponding to a number of users 10. The techniques disclosed herein can operate on a single device, or operate on a computing platform that utilizes a combination of computers, including the servers described herein.

In this example, the First User 10A is associated with the first computer 11A, the Second User 10B is associated with the second computer 11B, the Third User 10C is associated with the third computer 11C, the Fourth User 10D is associated with the fourth computer 11D, the Fifth User 10E is associated with the fifth computer 11E, the Sixth User 10F is associated with the sixth computer 11F, the Seventh User 10G is associated with the seventh computer 11G, the Eighth User 10H is associated with the eighth computer 11H, the Ninth User 10I is associated with the ninth computer 11I, the tenth User 10J is associated with the tenth computer 11J, the Eleventh User 10K is associated with the eleventh computer 11K, and the Twelfth User 10I is associated with the Twelfth computer 11L. These users can also be respectively referred to as "User A," User B," up to User N. Computers they are each operating can be respectively referred to as "Computer A," Computer B," "Computer C," etc. The computers can be in the form of desktop computers, head-mounted display units, tablets, mobile phones, etc.

The users can communicate using live message threads, which can display messages 122 of a thread 121, and each thread can be displayed using a particular "delivery interface." One example of a delivery interface can be a user interface of a messaging application. A messaging application can allow users to exchange real-time messages and include links to users and content. When a user is named in a message, the system can build a link within a portion of the message that conveys the user's name 135, and the link could be to an identifier 134 for that user. The link can also be configured such that when a user selects the person's name from the text of the message, the system can invoke a number of actions including generating an e-mail, provide additional information regarding the user, etc. When a user is named in a message and an identifier is linked to text of that person's name, this is referred to herein as an "@mention" or a "user reference."

Other examples of a delivery interface can include a Team, Channel, document, or any other collection of data that can be displayed with messages of a message thread. For instance, if a participant of several message threads wishes to select a specific set of threads, they can provide an input that defines a set of delivery interfaces, e.g., a specific set of Teams or Channels. This will allow the system to select all threads in that specific set of Teams or Channels. In another example, a user or computer can provide an input that defines a set of delivery interfaces, e.g., a set of documents. This will allow the system to select all message threads in that specific set of documents. That way, a user can assign rights to other specific users as delegates to a specific collection of threads without having to select each message thread.

The system 100 can utilize delegate assignments 130, user status information 140, and actions related to a thread 121 to determine when permissions 150 should be modified to allow a delegate to view and respond to messages of that thread. The message threads can be stored in one or more thread containers 120, and each container 120 can also include data indicating a delivery interface type 124 and a member list 125. As shown in FIG. 1, in this example, the permissions can define a number of attributes to grant each user with rights to read from a thread and/or write to a thread. The permissions can also restrict users from accessing specific threads.

In one example, the system can execute a method for managing permissions 150 for a delegate 10F assigned to a participant 10A of a message thread 121A. FIG. 1 shows that the first user 10A is @mentioned in a message 122C. The @mentioned, which is also referred to herein as a "user reference" can include the user's identity associated with text of the message. The identity can include an e-mail address or any other type of unique identifier for that user. The system can analyze messages 122 of the message thread 121A to identify a message 122C comprising a user reference 129, e.g., an @mention. The user reference 129 can include an identifier 134 of the participant 10A embedded within a portion of the message 122C, e.g., a portion that includes the name or a moniker of the user.

In this example, the status information 140 indicates that the first user is unavailable. This status can be established by having the user set a calendar event indicating that they are unavailable, setting an automatic reply on e-mail indicating that they are out of the office, send one or more emails indicating that they are unavailable, etc. Also shown, the first user 10A has designated User 10F as a delegate for a particular message thread, Thread 1, the first user 10A has also designated User 10G as a delegate for another particular message thread, Thread 2. Also, the first user 10A has designated User B as a delegate for a set of threads that are part of a specific Team, Team A, and threads that are embedded in Spreadsheet documents, e.g., XLSX files. As will be described in more detail below, in one example, when User 10A is mentioned in the first thread, Thread 1, the system can modify the permissions for User 10F to Read and Write Access for Thread 1 in response to an @mention for User 10A in Thread 1 while User 10A is unavailable, e.g., out-of-office, offline, etc. User 10F can then have access to the messages of the Thread 1 container.

Figure 2A:
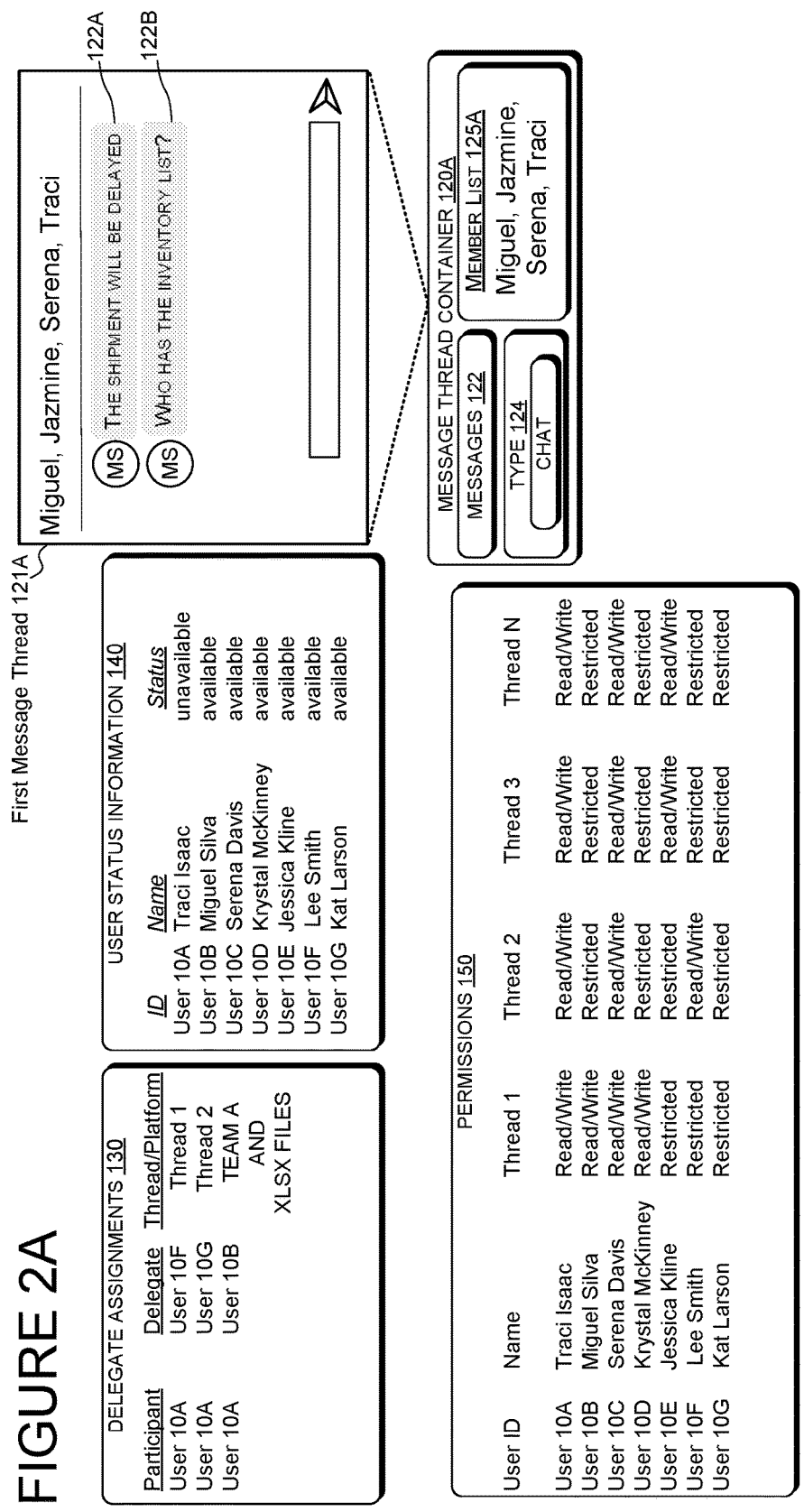
FIG. 2A illustrates a data set where a participant has selected a delegate for a specific thread and activity data indicates that the participant is unavailable.

FIGS. 2A-2D show example where a primary participant, User 10A, has selected a specific delegate, User 10F, for a specific thread, a first thread 121A. This example involves a message thread 121A involving several participants: User 10A, User 10B, User 10C and User 10D. FIG. 2A illustrates the state of a data set where a participant, User 10A, has selected a delegate, User 10F, for a specific thread, First Thread 121A. It is also a given that the activity data, e.g., the user status information 140, indicates that the participant, User 10A is unavailable. At this point in the chat thread, there is no user reference in the messages 122A and 122B.

Figure 2B:
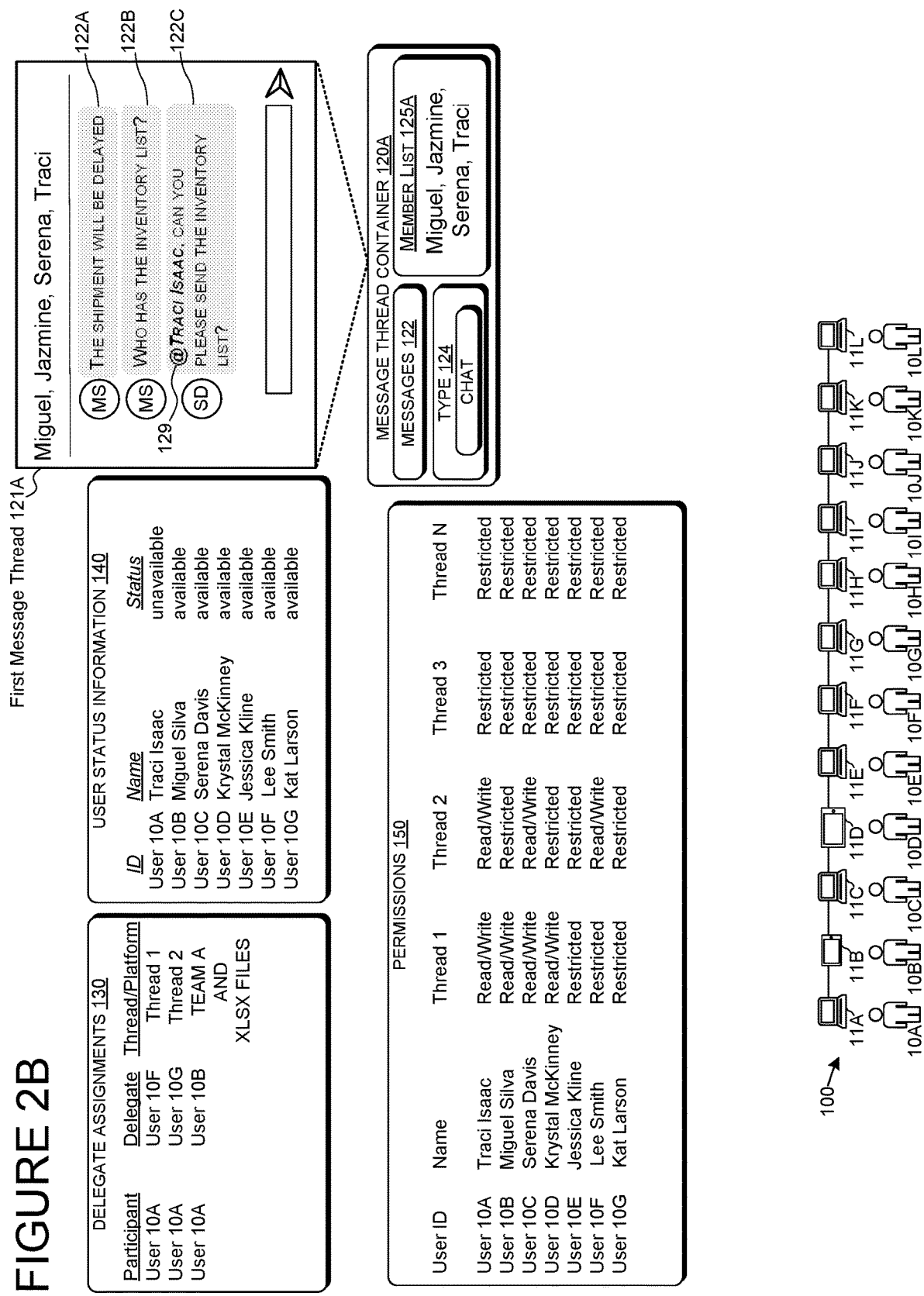
FIG. 2B illustrates a portion of a message thread where a participant of a specific thread is mentioned in a message.

As shown in FIG. 2B, when an @mention is detected, the system can determine if the mentioned person is unavailable, e.g., has set an out of office status. The system can execute operations for analyzing status information 140 to determine that the status information 140 indicates that the participant 10A associated with the user reference 129 is unavailable, in response to determining that the message 122C comprises the user reference 129 including the identifier 134 of the participant 10A. The system can also identify a delegate when system detects that the mentioned person is unavailable, e.g., has set out of office message to be sent. In response to determining that the status information 140 indicates that the participant 10A associated with the user reference 129 is unavailable, the system can analyze data defining one or more delegate assignments 130 to identify the delegate, such as User 10F. The data can indicate that a specific set of users, such as User 10F, is assigned as a delegate and eligible to receive messages 122 of the message thread 121A and eligible to respond to the message thread 121A as a representative for the participant 10A associated with the user reference 129.

As shown in FIG. 2C, in response to determining that the status information 140 indicates that the participant 10A associated with the user reference 129 is unavailable and that the delegate 10F is assigned to respond to the message thread 121A as a representative for the participant 10A, the system can modify permissions 150 to generate modified permissions 150' for the message thread 121A to grant the delegate 10F access rights to receive a message thread container 120A comprising the messages 122 of the message thread 121A and the message 122C comprising the user reference 129. As shown in FIG. 2C, in this example, User 10F has Read and Write permissions. The permissions can also include other attributes that indicates User 10F is a delegate, e.g., a "D" attribute, which can cause the system to display customize messages when the delegate responds to the thread for the primary participant, User 10A. A customized message may indicate that User 10F is replying on behalf of User 10A.

Also shown in FIG. 2C, the system can package the immediate message including the "@name" information for the primary participant, User 10A, and the messages 122 of the message thread 121A, including the immediate message 122C, and send the packaged container 120A to a computer 11F of the delegate, User 10F. This can include operations for communicating at least a portion of the message thread container 120A to a computing device 11F associated with the delegate 10F. The portion of the message thread container 120A can include the messages 122 of the message thread 121A and the message 122C comprising the user reference 129 of the participant 10A. The modified permissions 150' can cause, or permit, the computing device 11F associated with the delegate 10F to display the messages 122 of the message thread 121A and the message 122C comprising the user reference 129.

Figure 2D:
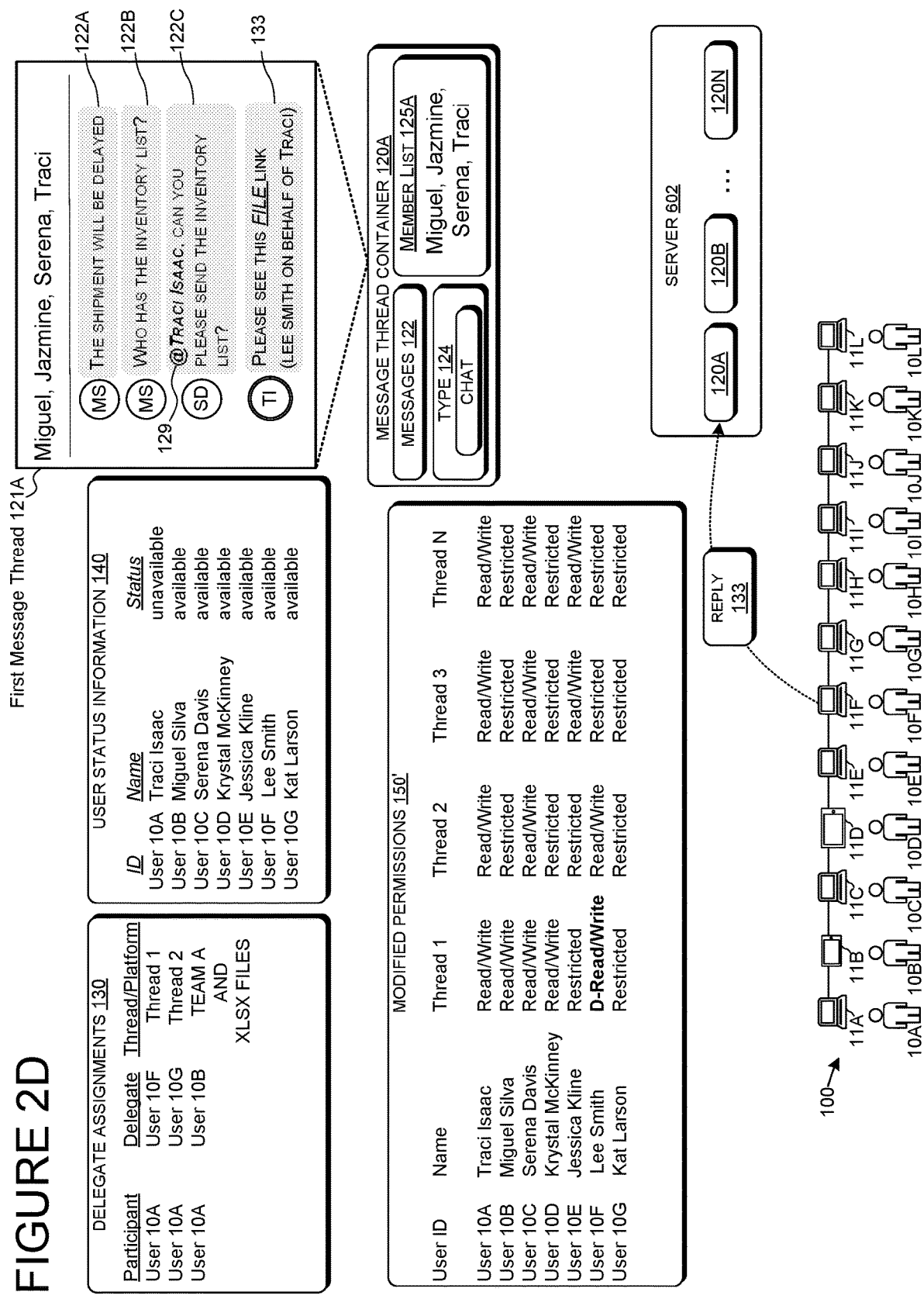
FIG. 2D illustrates an example where a computer of a delegate has access to display a thread of a thread participant and where the delegate has provided a response to the thread.

As shown in FIG. 2D, once the delegate responds, the system automatically directs the response to the main thread, e.g., Thread 1, and the UI can show a graphical relationship that indicates that the reply messages is related to the original message with the @mention. As shown in FIG. 2D, the system can receive a reply message 133 from the computing device 11F associated with the delegate 10F. The system can then direct the reply message 133 to the message thread container 120A comprising the messages 122 of the message thread 121A. The message thread container 120A causes the reply message 133 to be displayed with a display interface of the message thread 121A. A position of the reply message 133 can be in proximity to the message 122C comprising the user reference 129, where the proximity, e.g., being separated by less than a threshold distance, shows the relationship between the reply message 133 and the original message 122C. The graphical element showing the initials of the primary participant, e.g., "TI" for Traci Isaac, can have distinguishing features, such as a double ring, to show that a delegate has responded for this participant.

Figure 3D:
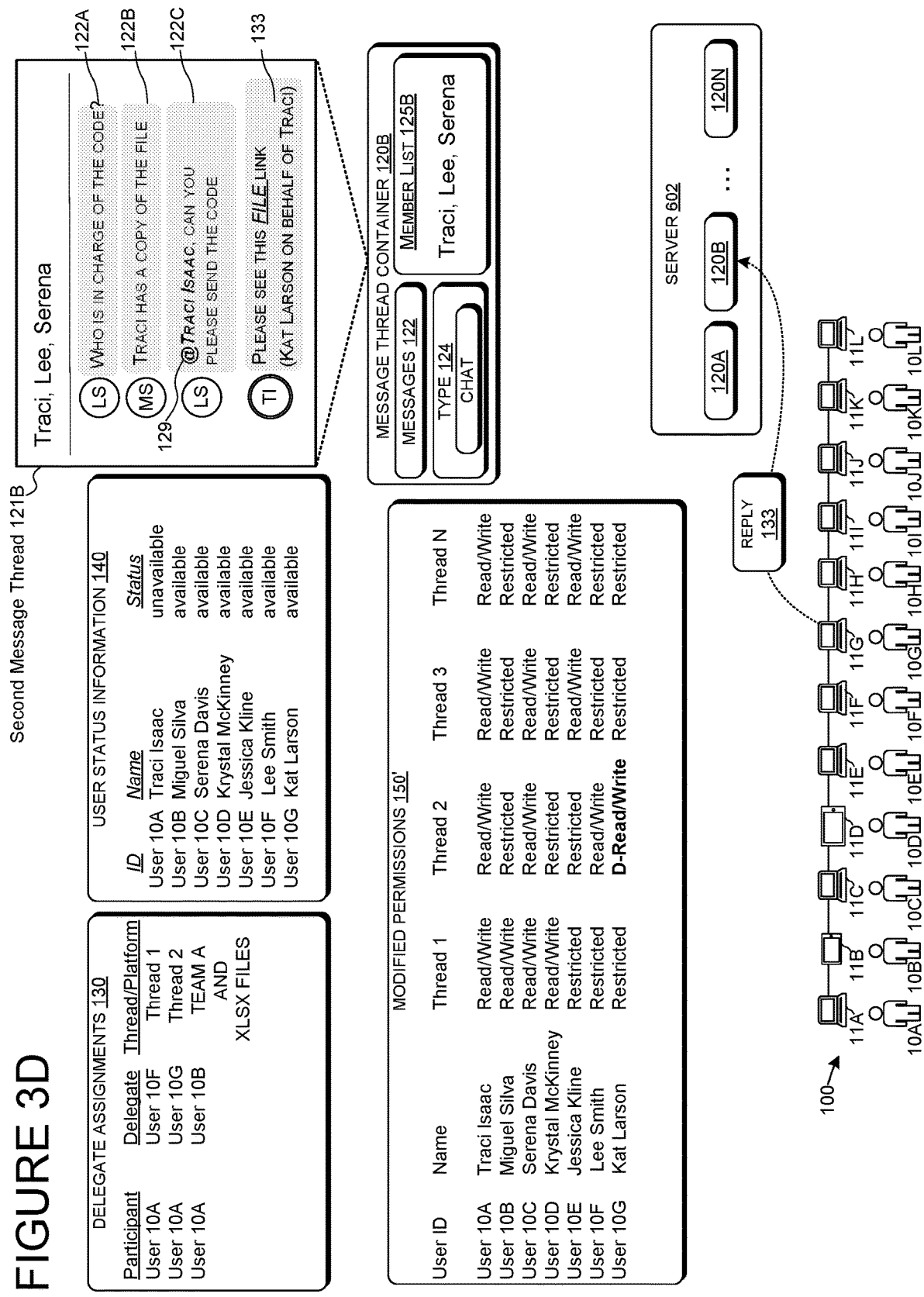
FIG. 3D illustrates an example where a computer of a delegate has access to display another specific thread of a thread participant and where the delegate has provided a response to that other specific thread.

FIGS. 3A-3D show another example where a primary participant, User 10A, has selected another delegate, User 10G, for another specific thread, the second thread 121B. These examples illustrate that the system can manage permissions at a granular level, where different delegates can be assigned to different threads or different sets of threads. This example involves a message thread 121B involving several participants: User 10A, User 10C and User 10F. FIG. 3A illustrates the state of a data set where a participant, User 10A, has selected a delegate, User 10G, for a specific thread, a second message thread 121B. It is also a given that the activity data, e.g., the user status information 140, indicates that the participant, User 10A is unavailable. At this point in the chat thread, there is no user reference in the messages 122A and 122B.

As shown in FIG. 3B, when an @mention is detected, the system can determine if the mentioned person is unavailable, e.g., has set an out of office status. The system can execute operations for analyzing status information 140 to determine that the status information 140 indicates that the participant 10A associated with the user reference 129 is unavailable, in response to determining that the message 122C comprises the user reference 129 including the identifier 134 of the participant 10A.

The system can also identify a delegate when system detects that the mentioned person is unavailable, e.g., has set out of office message to be sent. In response to determining that the status information 140 indicates that the participant 10A associated with the user reference 129 is unavailable, the system can analyze data defining one or more delegate assignments 130 to identify the appointed delegate, such as User 10G. The data can indicate that a specific set of users, such as User 10G, is assigned as a delegate and eligible to receive messages 122 of the message thread 121B and eligible to respond to the message thread 121B as a representative for the participant 10A associated with the user reference 129.

As shown in FIG. 3C, in response to determining that the status information 140 indicates that the participant 10A associated with the user reference 129 is unavailable and that the delegate 10G is assigned to respond to the message thread 121B as a representative for the participant 10A, the system can modify permissions 150 to generate modified permissions 150' for the message thread 121B to grant the delegate 10G access rights to receive a message thread container 120B comprising the messages 122 of the message thread 121B and the message 122C comprising the user reference 129. As shown in FIG. 3C, in this example, User 10G has Read and Write permissions in the modified permissions 150'. The permissions can also include other attributes that indicates User 10G is a delegate, e.g., a "D" attribute, which can cause the system to display customize messages when the delegate responds to the thread for the primary participant, User 10A. A customized message may indicate that User 10G is replying on behalf of User 10A.

Also shown in FIG. 3C, the system can package the immediate message including the "@name" information for the primary participant, User 10A, and the messages 122 of the message thread 121B, including the immediate message 122C, and send the packaged container 120B to a computer 11G of the delegate, User 10G. This can include operations for communicating at least a portion of the message thread container 120B to a computing device 11G associated with the delegate 10G. The portion of the message thread container 120B can include the messages 122 of the message thread 121B and the message 122C comprising the user reference 129 of the participant 10A. The modified permissions 150' can cause, or permit, the computing device 11G associated with the delegate 10G to display the messages 122 of the message thread 121B and the message 122C comprising the user reference 129.

As shown in FIG. 3D, once the delegate responds, the system automatically directs the response to the main thread, e.g., Thread 2, and the UI can show a graphical relationship that indicates that the reply messages is related to the original message with the @mention. As shown in FIG. 4C, in this example, the system can receive a reply message 133 from the computing device 11G associated with the delegate 10G. The system can then direct the reply message 133 to the message thread container 120B comprising the messages 122 of the message thread 121B.

The message thread container 120B can enable a system to cause the reply message 133 to be displayed with a display interface of the message thread 121B. A position of the reply message 133 can be in proximity to the message 122C comprising the user reference 129, where the proximity, e.g., being separated by less than a threshold distance, shows the relationship between the reply message 133 and the original message 122C of the second thread 121B. The graphical element showing the initials of the primary participant, e.g., "TI" for Traci Isaac, can have some distinguishing features, such as a double ring, to show that a delegate has responded for this participant.

As described herein, a user can add different delegate users for different granularity, e.g., different delivery interfaces: groups, threads, Teams, Channels, group chats, websites, communities, pages, etc. So that whenever users are @Mentioned in that specific delivery interface or a specific thread, a delegate user will get notified for the participant that was @mentioned in that thread post. The prior examples and the following example of FIGS. 4A-4E show additional scenarios showing these features, where a person can add a different delegate for individual threads or delivery interfaces, e.g., a delegate can be selected for certain Teams, Documents, Channels, etc.

FIG. 4A-4E shows another example where a primary participant, User 10A, has selected another delegate, User 10B, for a collection of threads that are defined by parameters provided by the primary participant. In this example, the primary participant has indicated that they have selected User B, Miguel, to be the delegate for all threads that are part of a specific Team, e.g., Team A, and all threads that are embedded in spreadsheet files, e.g., all XLSX files. This example, along with the other examples, show that the system can manage permissions at a granular level, where different delegates can be assigned to different threads or different sets of threads. This example involves two message threads, a third thread 121C and an Nth thread 121N. The third thread 121C has participants User 10A, User 10C and User 10E, and the Nth thread 121N has participants User 10A, User 10C and User 10E.

Figure 4A:
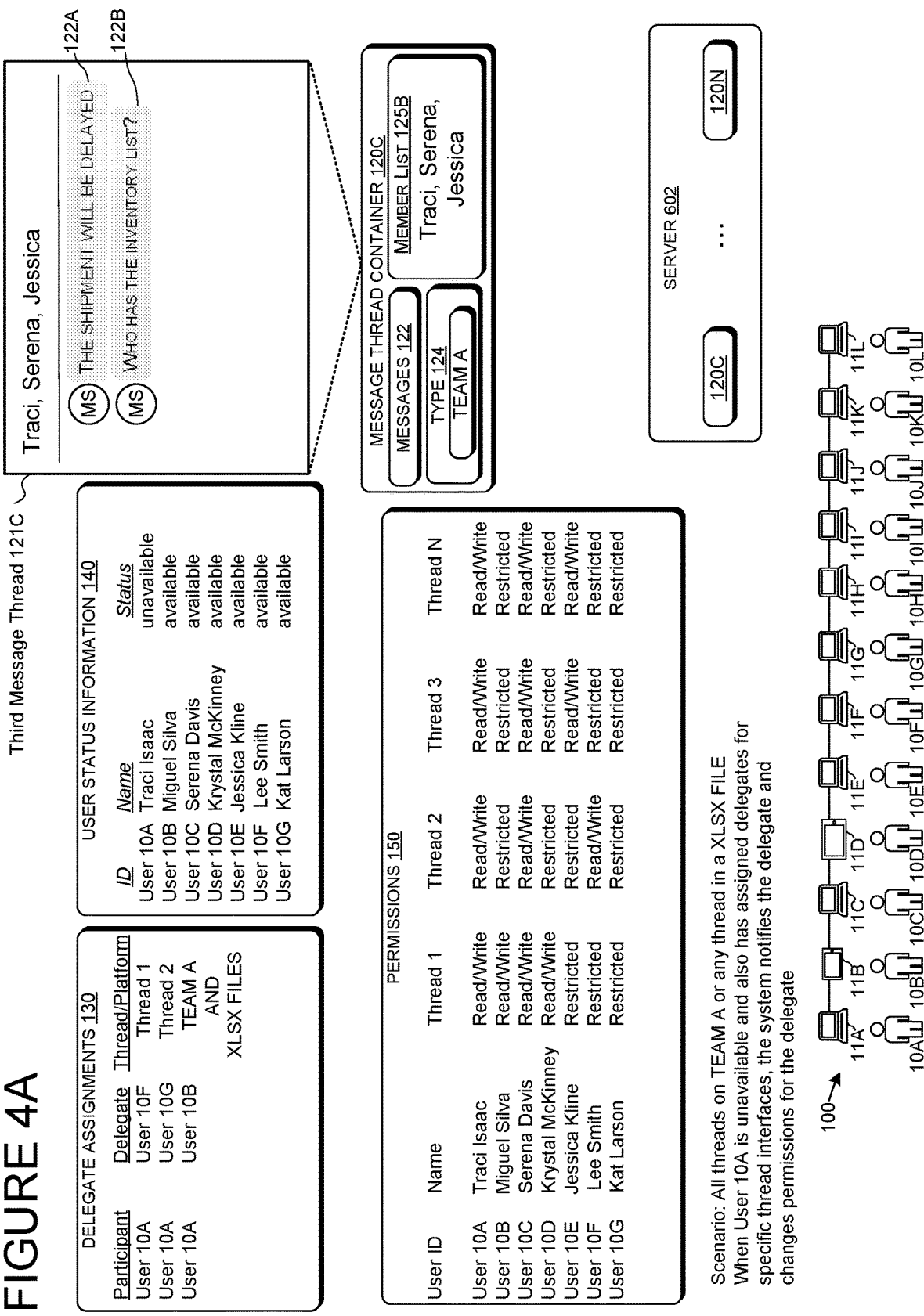
FIG. 4A illustrates a data set where a participant has selected a specific delegate for threads of two different delivery interfaces, all threads in a specific Team and all threads in spreadsheet files owned by the participant, and activity data indicates that the participant is unavailable.
Figure 4C:
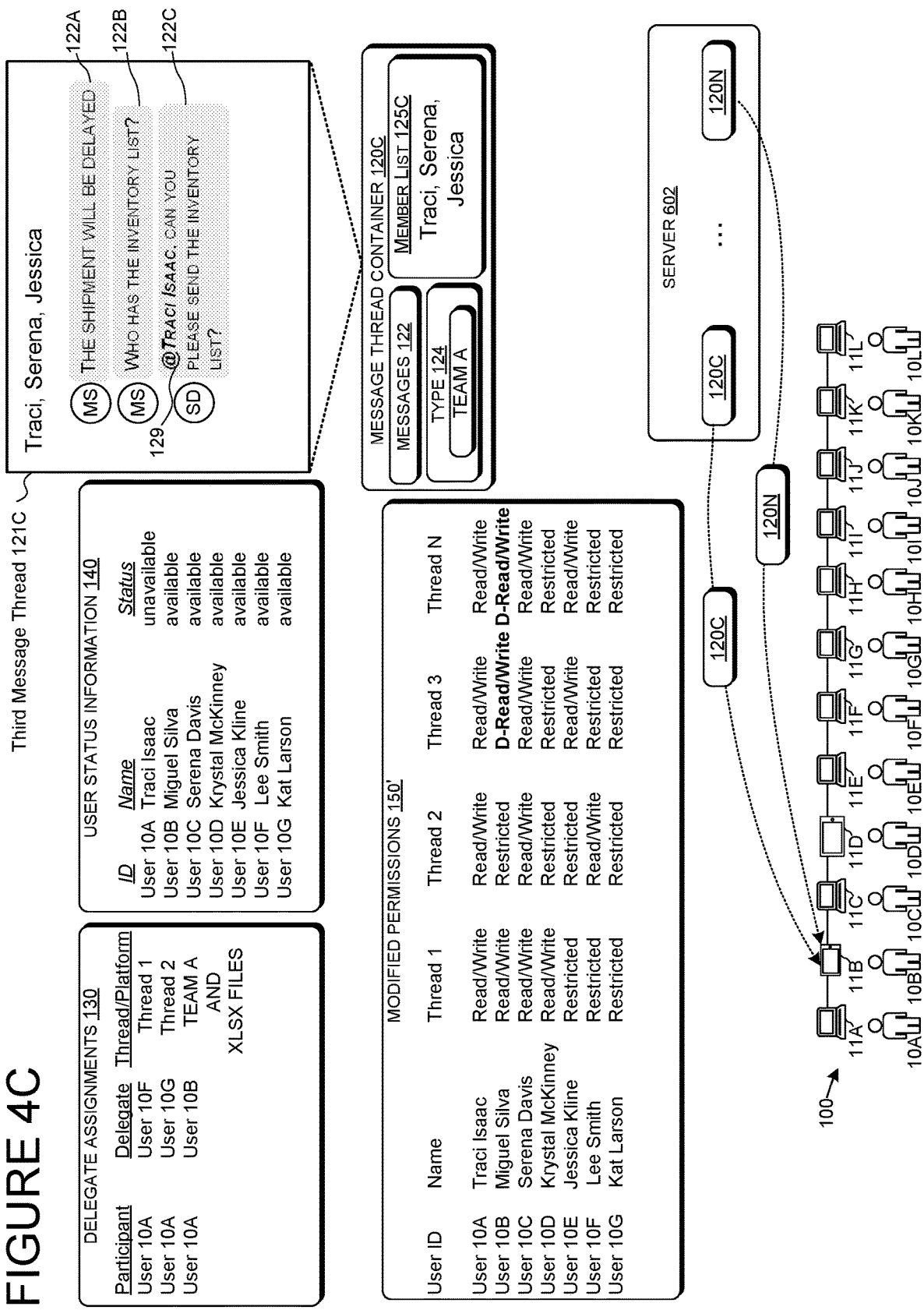
FIG. 4C illustrates an example of modified permissions that grant the specific delegate with permissions to access to all threads in a specific Team and all threads in spreadsheet files owned by the participant when the participant is listed as unavailable and when the specific delegate is named as a delegate for these threads.

FIG. 4A illustrates the state of a data set where a participant, User 10A, has selected a delegate, User 10B, for all threads that are part of a specific Team, e.g., Team A, and all threads that are embedded in spreadsheet files, e.g., all XLSX files. It is also a given that the activity data, e.g., the user status information 140, indicates that the participant, User 10A is unavailable. At this point in the chat thread, there is no user reference in the messages 122A and 122B.

As shown in FIG. 4B, when an @mention is detected in the third thread 121C, the system can determine if the mentioned person is unavailable, e.g., has set an out of office status 136. The system can execute operations for analyzing status information 140 to determine that the status information 140 indicates that the participant 10A associated with the user reference 129 is unavailable, in response to determining that the message 122C in the third thread 121C comprises the user reference 129 including the identifier 134 of the participant 10A.

The system can also identify a delegate when system detects that the mentioned person is unavailable, e.g., has set out of office message to be sent. In response to determining that the status information 140 indicates that the participant 10A associated with the user reference 129 is unavailable, the system can analyze data defining one or more delegate assignments 130 to identify the appointed delegate, such as User 10B. The data can indicate that a specific set of users, such as User 10B, is assigned as a delegate and eligible to receive messages 122 for all threads that are part of a specific Team, e.g., Team A, and all threads that are embedded in spreadsheet files, e.g., all XLSX files. The delegate can also send messages to all threads that are part of a specific Team, e.g., Team A, and all threads that are embedded in spreadsheet files, e.g., all XLSX files, as a representative for the participant 10A associated with the user reference 129. For this example, this set of threads includes the third thread 121C and the Nth thread 121N since the third thread 121C is part of the defined team, Team A, and because the Nth thread 121N is in an XLSX file, as noted in the type 124 attribute of each container.

As shown in FIG. 4C, in response to determining that the status information 140 indicates that the participant 10A associated with the user reference 129 is unavailable and that the delegate 10B is assigned to respond to the message that is in the third thread 121C as a representative for the participant 10A, the system can modify permissions 150 to generate modified permissions 150' for the third thread 121C and the Nth thread 121N to grant the delegate 10B access rights to receive a message thread container for each thread. The containers can include the messages 122 of the third thread 121C and the Nth thread 121N, which include any message, such as message 122C, comprising the user reference 129. In any embodiment, the analysis of the status information and or the delegate assignments can be in response to the detection of a user reference 129 in a message of any of the identified threads meeting the criteria defined in the delegates assignments 130, e.g., specific threads, threads in a specific Team, threads in a specific set of files, etc. Users can also identify files for appointing delegates by file type, identifying information of any file contents, search strings for content or file names, etc. Similar techniques can be achieved for other delivery interfaces, e.g., Teams, Channels, etc. For example, a user can identify specific sets of Teams by the use of search strings for content or Team names to cause the system to select certain threads within Teams for appointing delegates.

As shown in FIG. 4C, in this example, User 10B has Read and Write permissions in the modified permissions 150' for the identified threads, the third thread and the Nth thread. In this example it is a given that the third thread 121C is part of a team, Team A, and thread N 121N is within an excel document, both delivery interfaces that are defined in the delegate assignments. The permissions can also include other attributes that indicates User 10B is a delegate, e.g., a "D" attribute, which can cause the system to display customize messages when the delegate responds to the thread for the primary participant, User 10A. A customized message may indicate that User 10B is replying on behalf of User 10A.

Also shown in FIG. 4C, the system can package the immediate message including the "@name" information for the primary participant, User 10A, and the messages 122 of the message thread 121C, including the immediate message 122C, and send the packaged container 120C to a computer 11B of the delegate, User 10B. The system can also package any other identified thread, including the "@name" information for the primary participant, User 10A, and the messages 122 of the other threads, such as Thread N 121N, and send the packaged container 120N to the computer 11B of the delegate, User 10B. This can include operations for communicating at least a portion of the message thread container(s) 120C and 120N to a computing device 11B associated with the delegate 10B. The portion of the message thread container(s) an include the messages 122 of the message thread(s) and the message(s) 122 comprising the user reference 129 of the participant 10A. The modified permissions 150' can cause, or permit, the computing device 11B associated with the delegate 10B to display the messages 122 of the identified message thread(s) 121B and the message(s) 122 comprising the user reference 129.

As shown in FIG. 4D, for the third thread 121C, once the delegate responds, the system automatically directs the response to the main thread, e.g., Thread 3, and the UI can show a graphical relationship that indicates that the reply messages is related to the original message with the @mention. As shown in FIG. 4D, in this example, the system can receive a reply message 133 from the computing device 11B associated with the delegate 10B. The system can then direct the reply message 133 to the message thread container 120C comprising the messages 122 of the message thread 121C.

The message thread container 120C can enable a system to cause the reply message 133 to be displayed with a display interface of the message thread 121C. A position of the reply message 133 can be in proximity to the message 122C comprising the user reference 129, where the proximity, e.g., being separated by less than a threshold distance, shows the relationship between the reply message 133 and the original message 122C of the third thread 121C. The graphical element showing the initials of the primary participant, e.g., "TI" for Traci Isaac, can have some distinguishing features, such as a double ring, to show that a delegate has responded for this participant.

As shown in FIG. 4E, for the Nth thread 121N, this example shows that a participant of the Nth thread has mentioned User 10A. Since the delegate 10B now has the permissions as a result of the status information of the participant 10A and the delegate assignments 130, the delegate can respond. Once the delegate responds, the system automatically directs the response to the main thread, e.g., Thread N, and the UI can show a graphical relationship that indicates that the reply messages is related to the original message with the @mention. As shown in FIG. 4E, in this example, the system can receive a reply message 133 from the computing device 11B associated with the delegate 10B. The system can then direct the reply message 133 to the message thread container 120N comprising the messages 122 of the message thread 121C.

The message thread container 120N can enable a system to cause the reply message 133 to be displayed with a display interface of the message thread 121N. A position of the reply message 133 can be in proximity to the message 122C comprising the user reference 129, where the proximity, e.g., being separated by less than a threshold distance, shows the relationship between the reply message 133 and the original message 122C of the Nth thread 121N. The graphical element showing the initials of the primary participant, e.g., "TI" for Traci Isaac, can have some distinguishing features, such as a double ring, to show that a delegate has responded for this participant.

In the embodiments disclosed herein, the modified permissions allowing a delegate to access particular threads or threads of certain delivery interfaces, can be changed back to permissions that restrict delegate to access particular threads or threads of certain delivery interfaces. The permissions can be changed back to a state where a delegate is restricted from accessing particular threads when the system detects that the status data of the participant indicates that the participant is available. Thus, when a person returns to the office, turns their out of office reply off, a sensor determines that they are located in the office, their calendar indicates they are available, or an email from them or a delegate indicates that they have returned, the system can automatically restrict delegate access to any thread defined in the assignments 130.

Figure 5B:
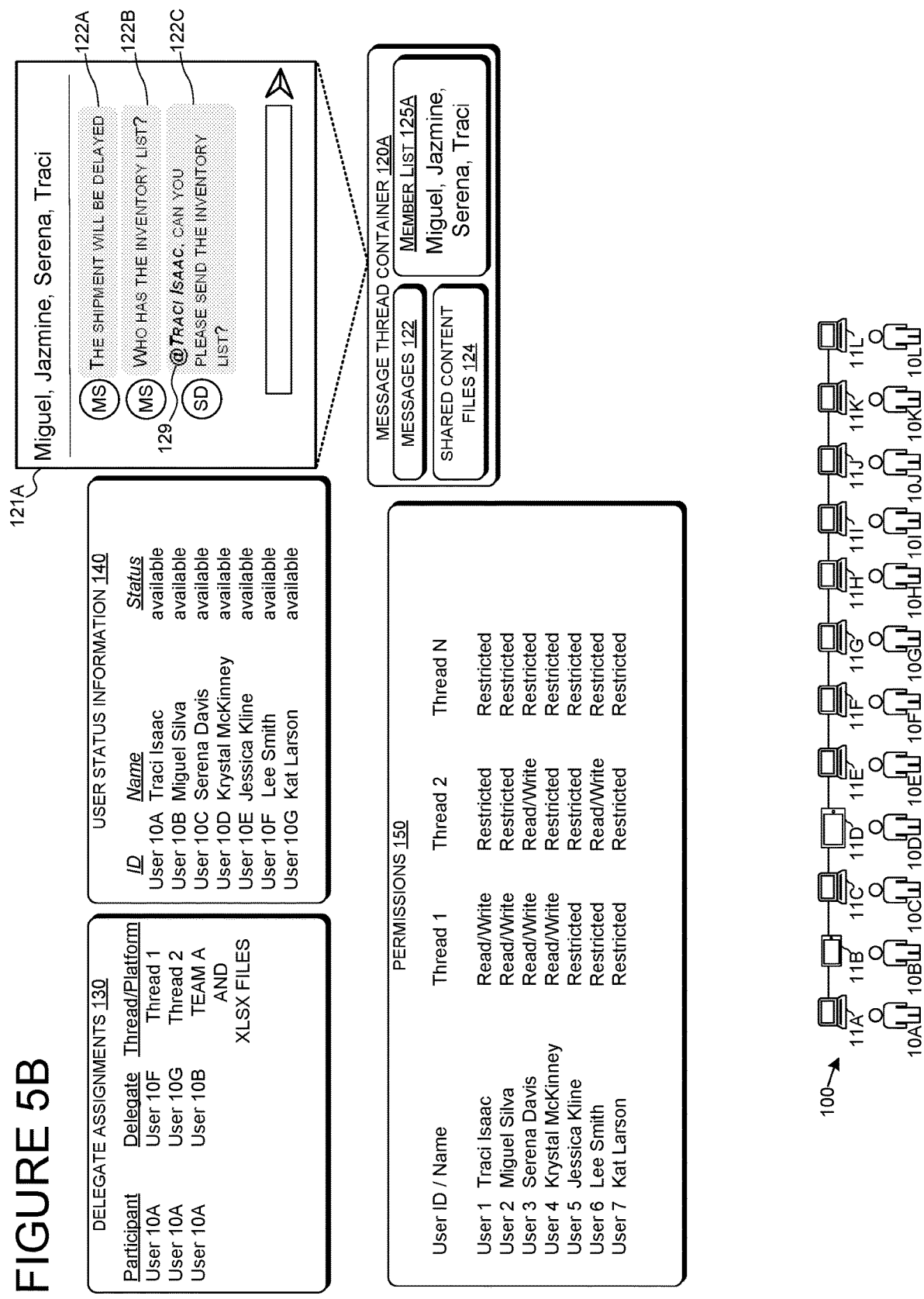
FIG. 5B illustrates a portion of a message thread where a participant of a specific thread is mentioned in a message.

FIGS. 5A-5C show example where a primary participant, User 10A, has selected a specific delegate, User 10F, for a specific thread, a first thread 121A. However, in this example, the status information indicates that User 10A is available. When this occurs, in some embodiments, the system may not grant a delegate with access to a thread. This example involves the first message thread 121A having several participants: User 10A, User 10B, User 10C and User 10D. FIG. 5A illustrates the state of a data set where a participant, User 10A, has selected a delegate, User 10F, for a specific thread, the First Thread 121A. It is also a given that the activity data, e.g., the user status information 140, indicates that the participant, User 10A is available. This means that the user has turned As shown in FIG. 5B, when an @mention is detected, the system can determine if the mentioned person is available, e.g., an out of office reply is turned off. The system can execute operations for analyzing status information 140 to determine that the status information 140 indicates that the participant 10A associated with the user reference 129 is available, in response to determining that the message 122C comprises the user reference 129 including the identifier 134 of the participant 10A. The system can also identify a delegate when system detects that the mentioned person is available. In response to determining that the status information 140 indicates that the participant 10A associated with the user reference 129 is available, the system can analyze data defining one or more delegate assignments 130 to identify the delegate, such as User 10F.

As shown in FIG. 5C, while the status information indicates that the participant is available, the system maintains the permissions by maintaining restrictions to prevent a delegate from accessing any identified threads and prevents any delegate from sending a reply to any identified threads. While the status information indicates that the participant is available, the system can verify that the delegate does not have access to any identified threads. If the system detects that the delegate does have access to the identified thread(s), this system can restrict that access, e.g., change it from a read or write to restricted setting.

FIG. 5D illustrates an example of permissions that are modified to grant a delegate with permissions to access a specific thread and permissions to reply to the specific thread when a thread participant is listed as available and when the thread participant is mentioned in a message of one of the threads. This is an alternative embodiment of FIG. 5C, the system can still grant notifications and permissions for delegates regardless of the availability status of the participant.

Referring now to FIGS. 6A-6E, an example of a user interface that shows how a delegate can receive a notification of an @mention is shown and described below. This example tracks the example of FIGS. 2A-2D. This example also shows how the system can display the thread to a delegate in their own working environment without having to switch applications. In this example, referring to the data set of example of FIG. 2A, User 10F is a delegate for the first thread 121A for User 10A. As shown in FIG. 6A, in this example, User 10F is working independently in their own private workspace, which in this case is a private chat with another user. This is at Time $T_0$, prior to an @mention in the first thread 121A where User 10A is a participant. Then, at Time $T_1$, after the @mention in the first thread 121A where User 10A is a participant, the user interface 101 for User 10F shows a notification 311. This notification 311 is in response to the @mention and the notification indicates that the message thread participant was mentioned in a message.

FIG. 6C illustrates an example of a thread preview that is displayed when a delegate has selected the notification 311 indicating that the message thread participant has been mentioned in a message. Here, User 10F has selected the notification, and in response, the system shows the thread preview 312. This preview can show the @mention and a portion of the message that contains the @mention. The preview can also show names of attendees. This preview is also referred to herein as a folder group, since a selection of the notification 311 can cause the system to display all threads that the delegate needs to respond to, the threads being displayed in a folder that is collapsible or expandable as the user interacts with the notification 311.

FIG. 6D illustrates an example of a UI showing a display of a thread when a delegate has selected the thread preview shown in FIG. 6C. In this example, the thread container for the first thread causes the display of the thread in a UI region 451 that is reserved for the primary participant's thread, e.g., a delegated thread, the first thread 121A. FIG. 6E illustrates an example of a UI showing a display of a reply generated by a delegate to the thread shown in FIG. 6D. In the response, the system can also show a graphical element 430 that indicates a delegate responded for the primary participant, User 10A.

Figure 7A:
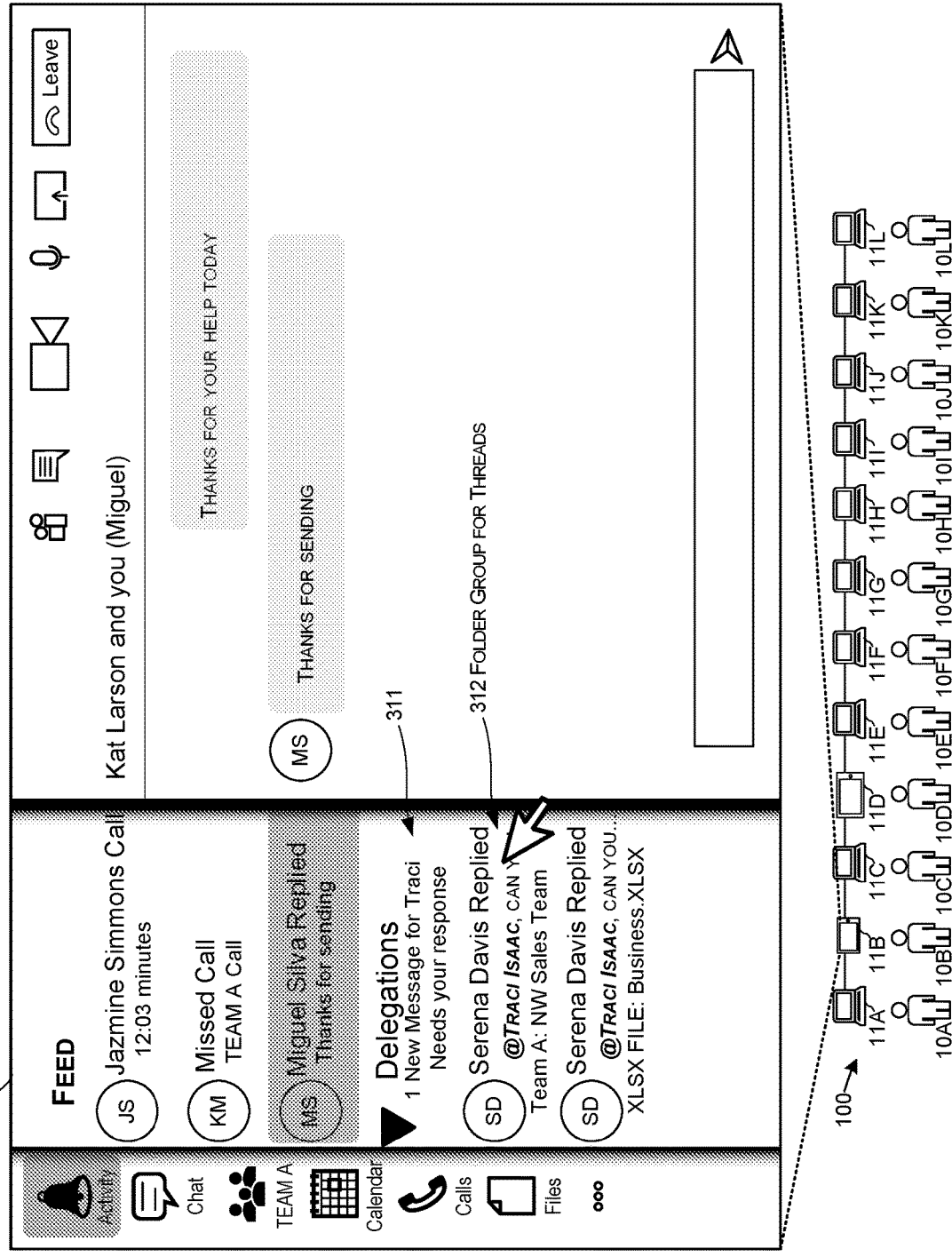
FIG. 7A illustrates an example a user interface of a communication application showing a private chat session viewed by a user who is designated as a delegate for a message thread participant, this user interface shows a folder group for threads that are associated with the delegate.
Figure 7C:
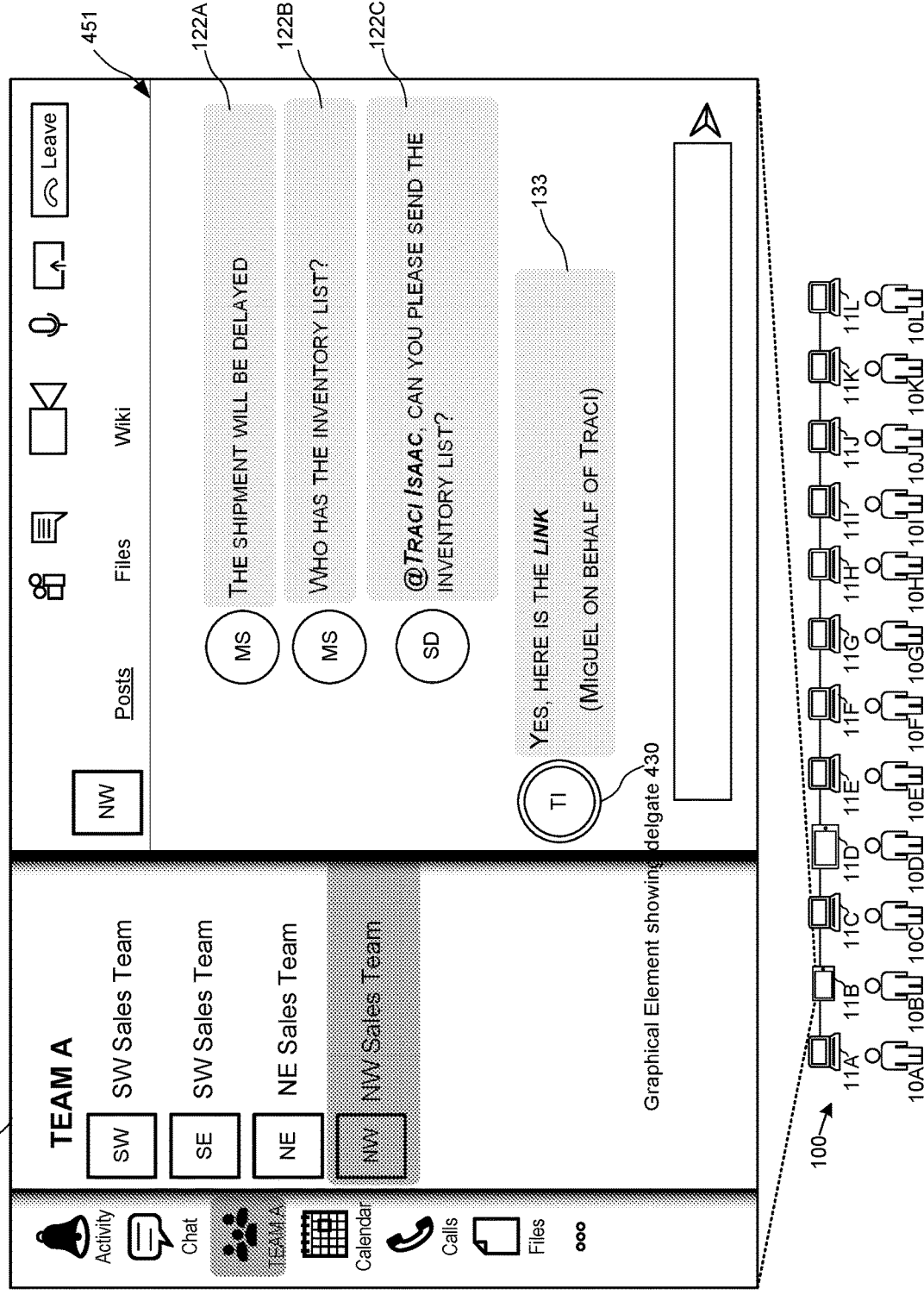
FIG. 7C illustrates an example of a UI showing a display of a reply generated by a delegate to the thread shown in FIG. 7B.

Referring now to FIGS. 7A-7C, an example of a user interface that shows how a delegate can receive a notification of an @mention is shown and described below. This example tracks the example of FIGS. 4A-4D, where one delegate is assigned to multiple threads. This example also shows how the system can display the thread to a delegate in their own working environment without having to switch applications. In this example, referring to the data set of example of FIG. 4A, User 10B is a delegate for the third thread 121C and the Nth thread 121N for User 10A based on the criteria set in the delegate assignments 130. As shown in FIG. 7A, in this example, User 10B is working independently in their own private workspace, which in this case is a private chat with another user. In this UI, a notification 311 is displayed in response to an @mention of User 10A in the third thread 121C and an @mention of User 10A in the Nth thread 121N where User 10A is a member. In response to a user selection of the notification 311, previews of each thread having an @mention of User 10A are displayed.

The previews can show the @mention and a portion of the message that contains the @mention. The preview can also show names of attendees. A preview or a collection of previews are referred to herein as a folder group 312, where the threads can be displayed in a folder that is collapsible or expandable as the user interacts with, e.g., selects or deselects, the notification 311.

FIG. 7B illustrates an example of a UI showing a display of the third thread 121C when the delegate has selected the thread preview of the third thread (listed as Team A) shown in FIG. 7A. In this example, the thread container for the third thread 121C causes the display of the thread in a UI region 451 that is reserved for the primary participant's thread, e.g., a delegated thread, which in this example is the third thread 121C. FIG. 7C illustrates an example of a UI showing a display of a reply generated by a delegate to the third thread. In the response, the system can also show a graphical element 430 that indicates a delegate responded for the primary participant, User 10A.

Figure 8A:
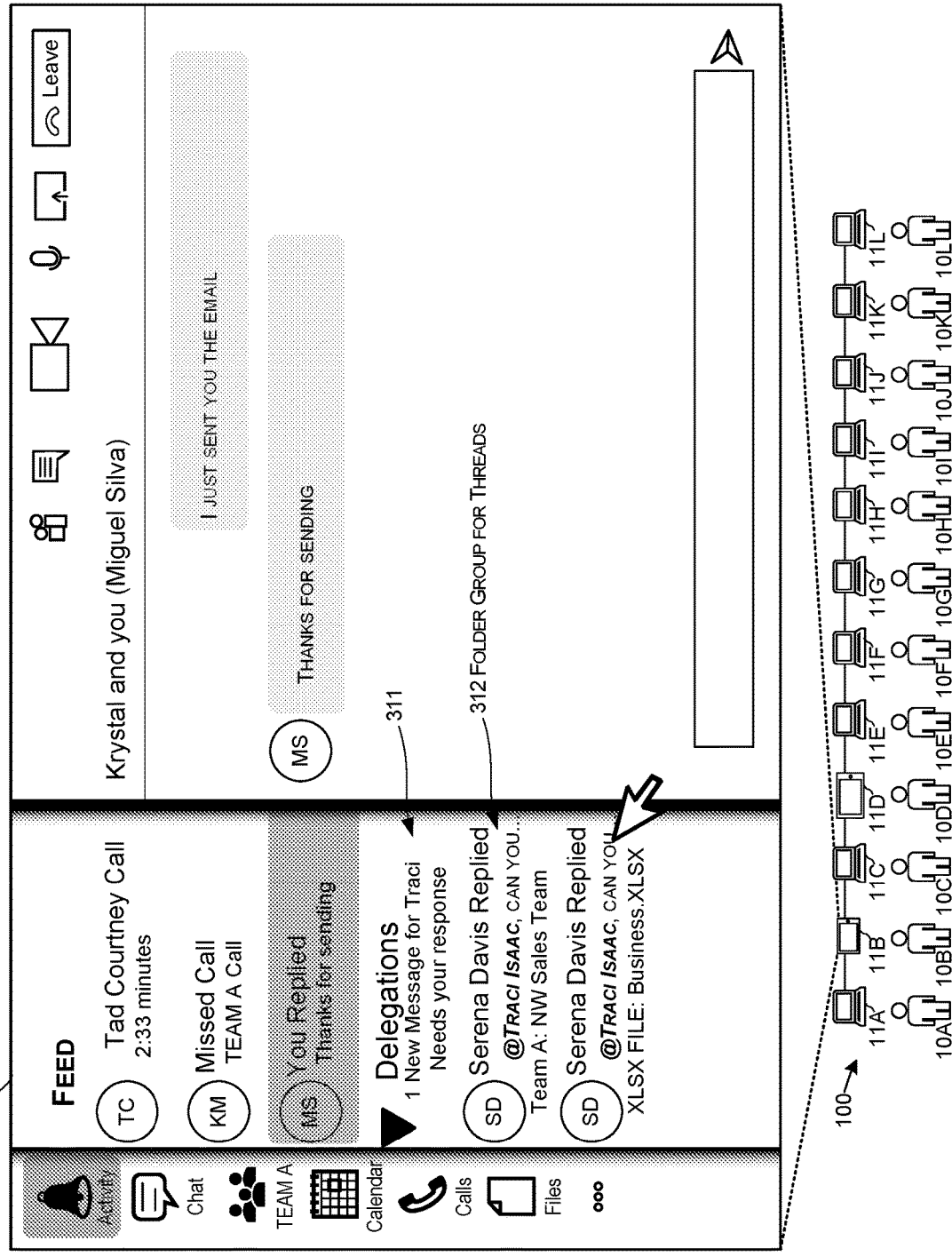
FIG. 8A illustrates an example a user interface of a communication application showing a private chat session viewed by a user who is designated as a delegate for a message thread participant, this user interface shows a folder group for threads that are associated with the delegate.

Referring now to FIGS. 8A-8C is an extension of the prior example is shown for the purposes of showing how different threads are accessed by the delegate. Similar to the example shown in FIG. 7A, in the user interface 101 of FIG. 8A, User 10B is working independently in their own private workspace, which in this case is a private chat with another user. As with the prior example, in this UI, a notification 311 is displayed in response to an @mention of User 10A in the third thread 121C and an @mention of User 10A in the Nth thread 121N where User 10A is a member. In response to a user selection of the notification 311, previews of each thread having an @mention of User 10A are displayed.

FIG. 8B illustrates an example of a UI showing a display of the Nth thread 121N within an editor of the XLSX file containing Nth thread. This UI of FIG. 8B is displayed when the delegate has selected the thread preview of the Nth thread (listed as XLSX File) shown in FIG. 8A. In this example, the thread container for the Nth thread causes the display of the thread in a UI region 451 that is reserved for the primary participant's thread, e.g., a delegated thread, which in this example is the Nth thread 121N. FIG. 8C illustrates an example of a UI showing a display of a reply generated by a delegate to the Nth thread. In the response, the system can also show a graphical element 430 that indicates a delegate responded for the primary participant, User 10A.

Figure 9:
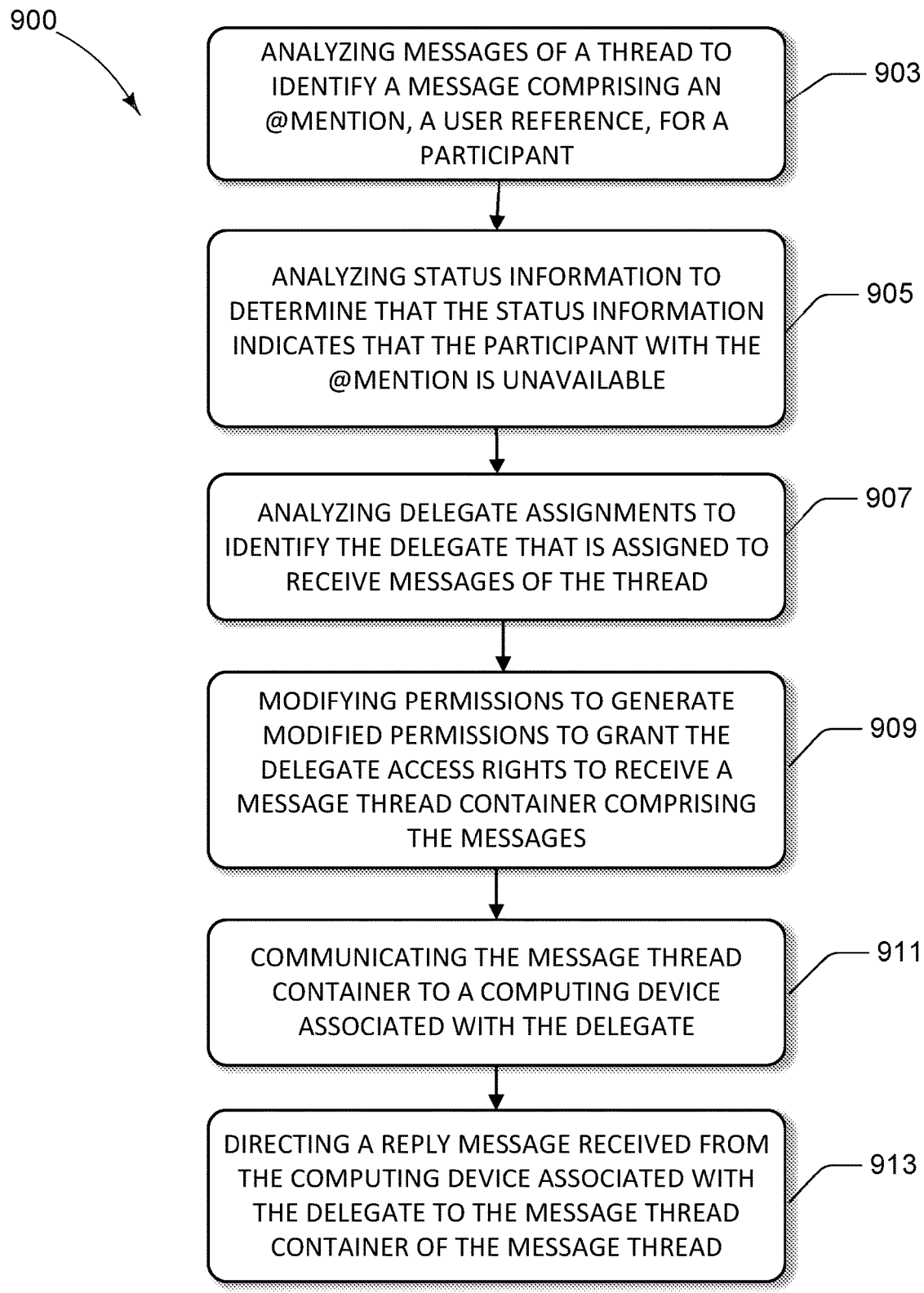
FIG. 9 is a flow diagram showing aspects of a routine for implementing aspects of the techniques and technologies presented herein.

FIG. 9 is a diagram illustrating aspects of a routine 900 for controlling the delivery of invitations capable of invoking actions, such as initiating a recording of a meeting. The techniques disclosed herein provide systems that have dynamic control of event invitations capable of invoking event recordings and other event functionality, such as a content share or an input to a vote. The system also enables a person to control event functionality without requiring the user to join the communication session.

It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can start or end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 9 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 900 includes an operation 903 where the system can analyze messages 122 of a message thread 121A to identify a message 122C comprising a user reference 129, e.g., an @mention. The user reference 129 includes an identifier 134 of the participant 10A embedded within a portion of the message 122C. This is shown in FIGS. 1 & 2 and other examples where a user, User A, is @mentioned in a message.

At operation 905, the system can analyze status information 140 to determine that the status information 140 indicates that the participant 10A associated with the user reference 129 is unavailable or available. One example is shown in FIG. 2B, when an @mention is detected and system detects that the mentioned person has set an out of office status, or otherwise has indicated in some communication that they are unavailable, the system can, in response to determining that the message 122C comprises the user reference 129 including the identifier 134 of the participant 10A, analyzing status information 140 to determine that the status information 140 indicates that the participant 10A associated with the user reference 129 is unavailable.

At operation 907, the system can analyze data defining one or more delegate assignments 130 to identify the delegate 10F that is assigned to receive messages 122 of the message thread 121A and assigned to respond to the message thread 121A as a representative for the participant 10A associated with the user reference 129. For example, in some embodiments, this operation can be invoked by any suitable operation described herein. In some embodiments, this operation can be invoked in response to determining that the status information 140 indicates that the participant 10A associated with the user reference 129 is unavailable and/or when the participant 10A is mentioned in a thread and has an assigned delegate.

At operation 909, the system can modify permissions 150 to generate modified permissions 150' for the message thread 121A to grant the delegate 10F access rights to receive a message thread container 120A comprising the messages 122 of the message thread 121A and the message 122C comprising the user reference 129. The modification of the permissions can be in response to determining that the status information 140 indicates that the participant 10A associated with the user reference 129 is unavailable and/or when the participant 10A is mentioned in a thread and has an assigned delegate.

At operation 911, the system can cause the communication of at least a portion of the message thread container 120A to a computing device 11F associated with the delegate 10F. The portion of the message thread container 120A can comprise the messages 122 of the message thread 121A and the message 122C comprising the user reference 129 of the participant 10A. The modified permissions 150' can also cause the computing device 11F associated with the delegate 10F to display the messages 122 of the message thread 121A and the message 122C comprising the user reference 129. For example, in FIG. 2C, the system can package the immediate message including "@name" and message thread including the immediate message, and send the packaged communications to the delegate.

At operation 913, once the delegate responds, the system automatically retrieves the response to reply back to the main thread. The system can receive a reply message 133 from the computing device 11F associated with the delegate 10F. In response, the system can direct the reply message 133 to the message thread container 120A comprising the messages 122 of the message thread 121A, wherein the message thread container 120A causes the reply message 133 to be displayed with a display of the message thread 121A, a position of the reply message 133 being in proximity to the message 122C comprising the user reference 129, wherein the system causes a display of one or more graphical elements showing a visual relationship between a display of the reply message and a display of the message 122C comprising the user reference 129.

Figure 10:
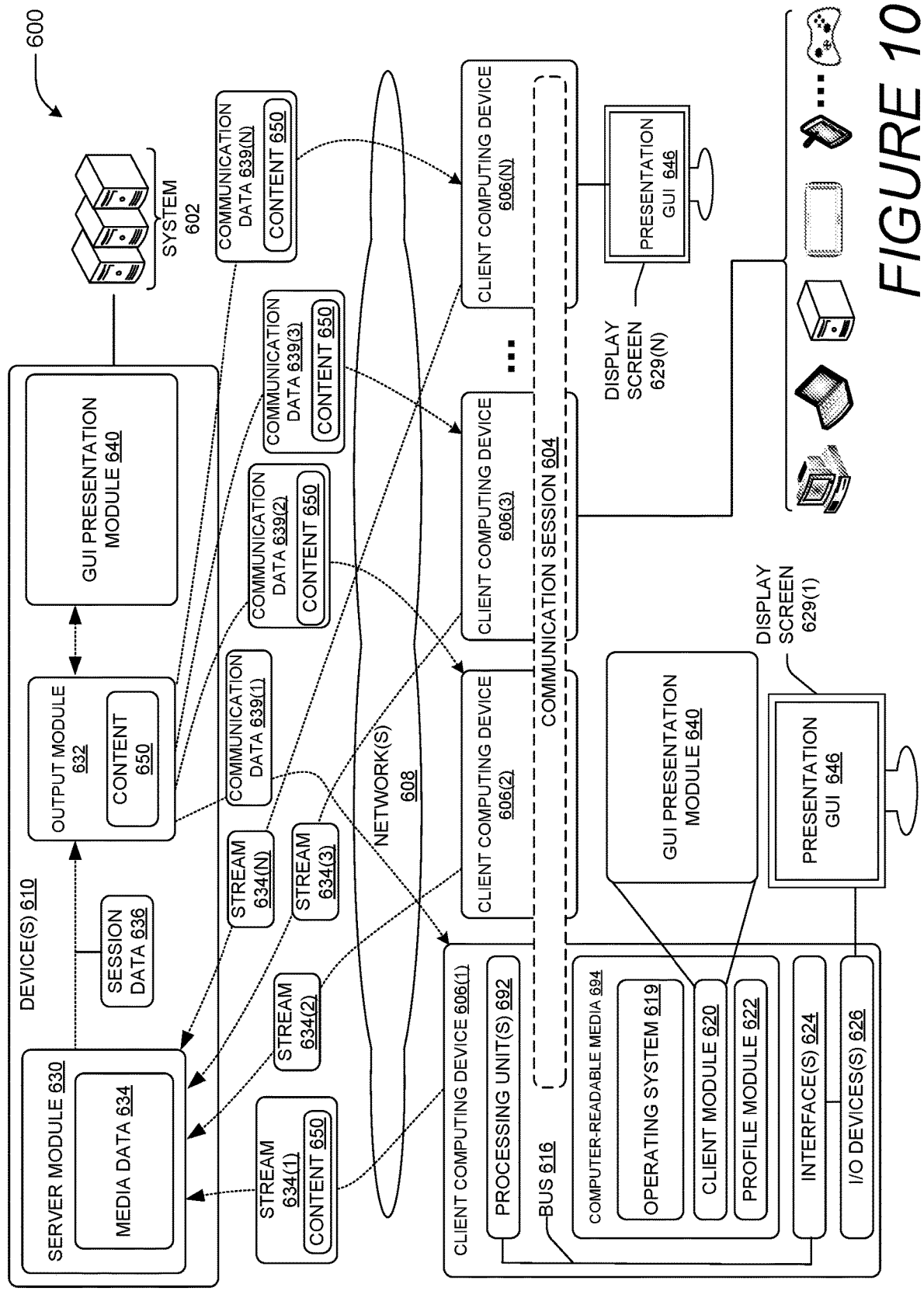
FIG. 10 is a computer architecture diagram illustrating an illustrative computer hardware and software architecture for a computing system capable of implementing aspects of the techniques and technologies presented herein.

FIG. 10 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 10 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 10 illustrates that client computing device 606(1) is in some way connected to a display device (e.g., a display screen 629(N)), which can display a UI according to the techniques described herein.

In the example environment 600 of FIG. 10, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 10) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 10, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown in FIG. 10, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 11:
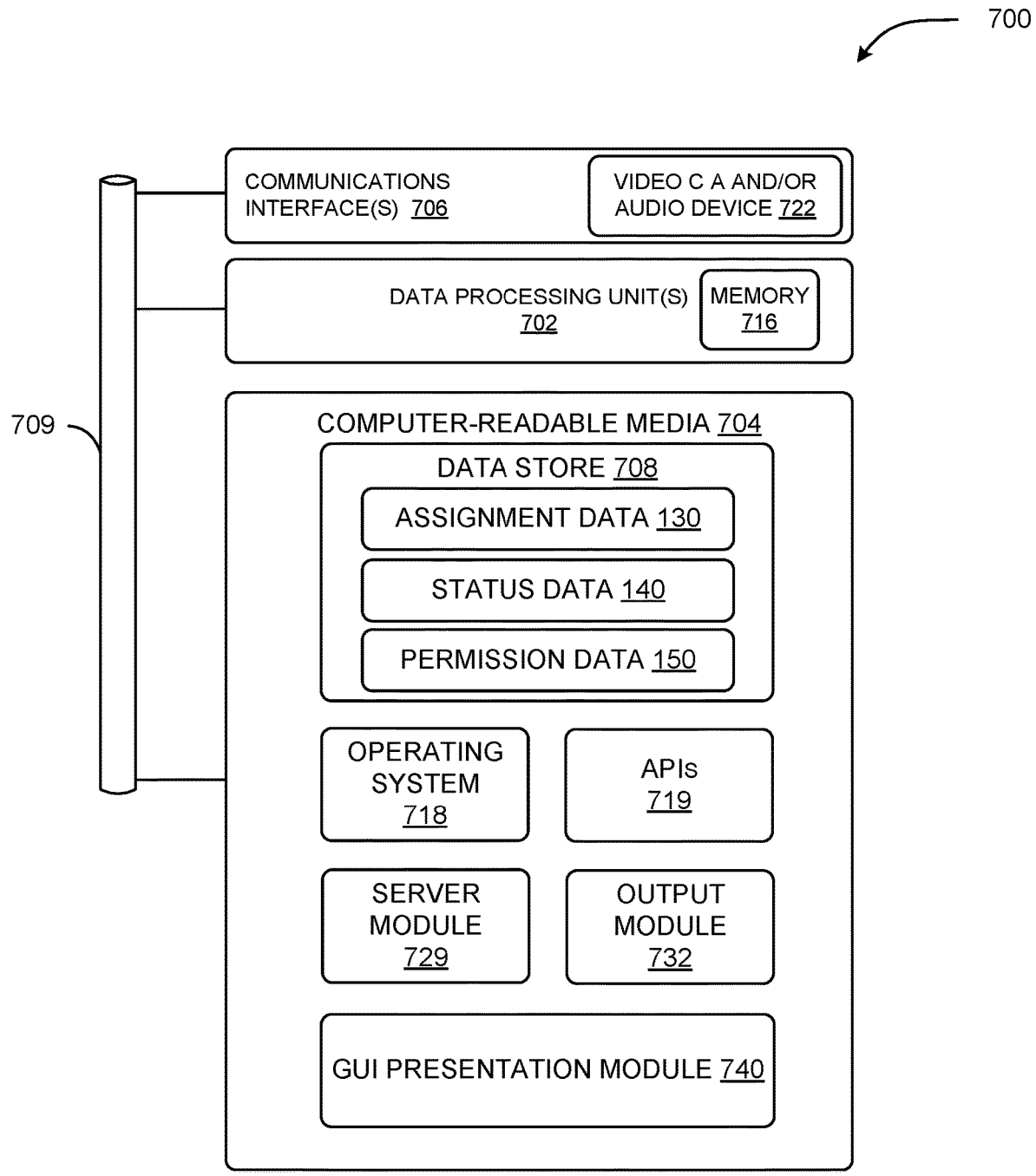
FIG. 11 is a computer architecture diagram illustrating a computing device architecture for a computing device capable of implementing aspects of the techniques and technologies presented herein.

FIG. 11 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store assignment data 130, status data 140, and permission data 150. The status data 140 can include a total number of participants (e.g., users and/or client computing devices) in a communication session, activity that occurs in the communication session, a list of invitees to the communication session, and/or other data related to when and how the communication session is conducted or hosted.

The status data 140 can define any type of activity or status related to the individual users 10A-10L. For instance, the contextual data can define a person's level in an organization, how each person's level relates to the level of others, a performance level of a person, or any other activity or status information about each person on the system. In some configurations, the status data can indicate whether a person is available or unavailable. A status of unavailability may be indicated by a person's vacation schedule on the calendar, when a person is in a meeting or conducting an activity that cannot be interrupted. This information can be established by the use of calendar information Indicating a vacation or indicating a status of a particular meeting or other communication that may indicate a person is unavailable. For instance, if a person states in an e-mail that they are going to be out of the office between 9 AM and 5 PM on a particular day, the system can update the status information and indicate that the person is unavailable. An out-of-office status or an unavailable status can also be detected by one or more sensors. For instance, if a user hasn't interacted with the keyboard or an input device for more than a predetermined period of time, the system may automatically move that person's status to indicate that they are unavailable.

Some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 719 (APIs) configured to expose the functionality and the data of the device 700 to other devices. Additionally, the computer-readable media 704 includes one or more modules such as the server module 729, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method for managing permissions for a delegate assigned to a participant of a message thread, the method for execution on a system, the method comprising:
   analyzing messages of the message thread to identify a message comprising a user reference, wherein the user reference includes an identifier of the participant embedded within a portion of the message;
   in response to determining that the message comprises the user reference including the identifier of the participant, analyzing status information to determine that the status information indicates that the participant associated with the user reference is unavailable;
   in response to determining that the status information indicates that the participant associated with the user reference is unavailable, analyzing data defining one or more delegate assignments to identify the delegate that is assigned to receive messages of the message thread and assigned to respond to the message thread as a representative for the participant associated with the user reference;
   in response to determining that the status information indicates that the participant associated with the user reference is unavailable and that the delegate is assigned to respond to the message thread as a representative for the participant: modifying permissions to generate modified permissions for the message thread to grant the delegate access rights to receive a message thread container comprising the messages of the message thread and the message comprising the user reference, and
   communicating at least a portion of the message thread container to a computing device associated with the delegate, the portion of the message thread container comprising the messages of the message thread and the message comprising the user reference of the participant, wherein the modified permissions cause the computing device associated with the delegate to display the messages of the message thread and the message comprising the user reference.

2. The method of claim 1, further comprising:
   receiving a reply message from the computing device associated with the delegate; and
   directing the reply message to the message thread container comprising the messages of the message thread, wherein the message thread container causes the reply message to be displayed with a display of the message thread, a position of the reply message being in proximity to the message comprising the user reference, wherein the system causes a display of one or more graphical elements showing a visual relationship between a display of the reply message and a display of the message comprising the user reference.

3. The method of claim 2, wherein modifying permissions for the message thread comprises generating the modified permissions to grant the delegate access rights to write the reply message to the thread container, using the modified permissions, the system permits the computing device associated with the delegate to submit the reply message to the message thread without requiring the delegate to be a member of the message thread.

4. The method of claim 1, further comprising: causing the computing device associated with the delegate to display at least the portion of the messages of the message thread and a portion of the message comprising the user reference in a group container, wherein the folder group container is selectable by a user input for causing display of the portion of the messages of the message thread and the message comprising the user reference within a region reserved for the messages.

5. The method of claim 1, wherein the delegate is a first delegate assigned to a specific thread, wherein the one or more delegate assignments identify a second delegate that is assigned to receive messages for individual threads that are each associated with individual delivery interfaces, wherein individual delivery interfaces include at least one of a channel, a chat, or a file type, or a file name, wherein the modified permissions are configured to allow the second delegate to receive messages for individual threads and reply to the individual threads, wherein the method further comprises communicating at least a portion of a second message thread container to a computing device associated with the second delegate, the portion of the second message thread container comprising the messages of a second message thread and the message of the second message thread comprising the user reference of the participant, wherein the modified permissions cause the computing device associated with the second delegate to display the messages of the second message thread and the message of the second message thread comprising the user reference.

6. The method of claim 1, further comprising: selecting a subset of the messages of the message thread, wherein individual messages of the subset of the messages have a threshold relevancy level with the message comprising the user reference, wherein communicating the at least the portion of the message thread container to the computing device associated with the delegate comprises communicating the subset of the messages to the computing device associated with the delegate.

7. The method of claim 1, wherein the system restricts the analysis of the delegate assignments to identify the delegate in response to determining that the participant associated with the user reference is available.

8. The method of claim 1, wherein the system does not allow the modification to the permissions for the message thread to grant the delegate access rights to receive data of a message thread container in response to determining that the participant associated with the user reference is available.

9. The method of claim 1, further comprising: generating a graphical element providing notice that the delegate is assigned to the message thread, that the status information indicates that the participant is unavailable, and that the user reference was added to the message of the message thread.

10. The method of claim 1, wherein the user reference is included in the message of a chat thread, wherein the message of the chat thread is received from another user other than the participant.

11. A system for managing permissions for a delegate assigned to a participant of a message thread, the system comprising:
one or more processors; and
a computer-readable storage medium having encoded thereon computer-executable instructions to cause the one or more processors to:

analyze messages of the message thread to identify a message comprising a user reference, wherein the user reference includes an identifier of the participant embedded within a portion of the message;
in response to determining that the message comprises the user reference including the identifier of the participant, analyze status information to determine that the status information indicates that the participant associated with the user reference is unavailable;
in response to determining that the status information indicates that the participant associated with the user reference is unavailable, analyzing data defining one or more delegate assignments to identify the delegate that is assigned to receive messages of the message thread and assigned to respond to the message thread as a representative for the participant associated with the user reference;
in response to determining that the status information indicates that the participant associated with the user reference is unavailable and that the delegate is assigned to respond to the message thread as a representative for the participant:
modify permissions to generate modified permissions for the message thread to grant the delegate access rights to receive a message thread container comprising the messages of the message thread and the message comprising the user reference, and
communicate at least a portion of the message thread container to a computing device associated with the delegate, the portion of the message thread container comprising the messages of the message thread and the message comprising the user reference of the participant, wherein the modified permissions cause the computing device associated with the delegate to display the messages of the message thread and the message comprising the user reference.

12. The system of claim 11, wherein the instructions further cause the one or more processors to:
receiving a reply message from the computing device associated with the delegate; and
directing the reply message to the message thread container comprising the messages of the message thread, wherein the message thread container causes the reply message to be displayed with a display of the message thread, a position of the reply message being in proximity to the message comprising the user reference, wherein the system causes a display of one or more graphical elements showing a visual relationship between a display of the reply message and a display of the message comprising the user reference.

13. The system of claim 11, wherein modifying permissions for the message thread comprises generating the modified permissions to grant the delegate access rights to write the reply message to the thread container, using the modified permissions, the system permits the computing device associated with the delegate to submit the reply message to the message thread without requiring the delegate to be a member of the message thread.

14. The system of claim 11, wherein the instructions further cause the one or more processors to: cause the computing device associated with the delegate to display at least the portion of the messages of the message thread and a portion of the message comprising the user reference in a group container, wherein the folder group container is selectable by a user input for causing display of the portion of the messages of the message thread and the message comprising the user reference within a region reserved for the messages.

15. The system of claim 11, wherein the delegate is a first delegate assigned to a specific thread, wherein the one or more delegate assignments identify a second delegate that is assigned to receive messages for individual threads that are each associated with individual delivery interfaces, wherein individual delivery interfaces include at least one of a channel, a chat, or a file type, or a file name, wherein the modified permissions are configured to allow the second delegate to receive messages for individual threads and reply to the individual threads, wherein the method further comprises communicating at least a portion of a second message thread container to a computing device associated with the second delegate, the portion of the second message thread container comprising the messages of a second message thread and the message of the second message thread comprising the user reference of the participant, wherein the modified permissions cause the computing device associated with the second delegate to display the messages of the second message thread and the message of the second message thread comprising the user reference.

16. The system of claim 11, wherein the instructions further cause the one or more processors to: select a subset of the messages of the message thread, wherein individual messages of the subset of the messages have a threshold relevancy level with the message comprising the user reference, wherein communicating the at least the portion of the message thread container to the computing device associated with the delegate comprises communicating the subset of the messages to the computing device associated with the delegate.

17. A computer-readable storage device having encoded thereon computer-executable instructions to cause one or more processing units of a system to manage permissions for a delegate assigned to a participant of a message thread, wherein the instructions cause one or more processing units to:
  analyze messages of the message thread to identify a message comprising a user reference, wherein the user reference includes an identifier of the participant embedded within a portion of the message;
  in response to determining that the message comprises the user reference including the identifier of the participant, analyze status information to determine that the status information indicates that the participant associated with the user reference is unavailable;
  in response to determining that the status information indicates that the participant associated with the user reference is unavailable, analyzing data defining one or more delegate assignments to identify the delegate that is assigned to receive messages of the message thread and assigned to respond to the message thread as a representative for the participant associated with the user reference;
  in response to determining that the status information indicates that the participant associated with the user reference is unavailable and that the delegate is assigned to respond to the message thread as a representative for the participant: modify permissions to generate modified permissions for the message thread to grant the delegate access rights to receive a message thread container comprising the messages of the message thread and the message comprising the user reference, and
  communicate at least a portion of the message thread container to a computing device associated with the delegate, the portion of the message thread container comprising the messages of the message thread and the message comprising the user reference of the participant, wherein the modified permissions cause the computing device associated with the delegate to display the messages of the message thread and the message comprising the user reference.

18. The computer-readable storage device claim 17, wherein the instructions further cause the one or more processing units to:
  receiving a reply message from the computing device associated with the delegate; and
  directing the reply message to the message thread container comprising the messages of the message thread, wherein the message thread container causes the reply message to be displayed with a display of the message thread, a position of the reply message being in proximity to the message comprising the user reference, wherein the system causes a display of one or more graphical elements showing a visual relationship between a display of the reply message and a display of the message comprising the user reference.

19. The computer-readable storage device claim 17, wherein modifying permissions for the message thread comprises generating the modified permissions to grant the delegate access rights to write the reply message to the thread container, using the modified permissions, the system permits the computing device associated with the delegate to submit the reply message to the message thread without requiring the delegate to be a member of the message thread.

20. The computer-readable storage device claim 17, wherein the delegate is a first delegate assigned to a specific thread, wherein the one or more delegate assignments identify a second delegate that is assigned to receive messages for individual threads that are each associated with individual delivery interfaces, wherein individual delivery interfaces include at least one of a channel, a chat, or a file type, or a file name, wherein the modified permissions are configured to allow the second delegate to receive messages for individual threads and reply to the individual threads, wherein the method further comprises communicating at least a portion of a second message thread container to a computing device associated with the second delegate, the portion of the second message thread container comprising the messages of a second message thread and the message of the second message thread comprising the user reference of the participant, wherein the modified permissions cause the computing device associated with the second delegate to display the messages of the second message thread and the message of the second message thread comprising the user reference.

* * * * *